(12) United States Patent
Ueyanagi

(10) Patent No.: US 6,396,776 B1
(45) Date of Patent: May 28, 2002

(54) RECORDING/REPRODUCING HEAD, RECORDING/REPRODUCING DISK DRIVE, AND METHOD FOR FABRICATING MAGNETIC SENSOR

(75) Inventor: Kiichi Ueyanagi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/572,850

(22) Filed: May 18, 2000

(30) Foreign Application Priority Data

May 21, 1999 (JP) ............................................ 11-141984

(51) Int. Cl.$^7$ .............................................. G11B 11/00
(52) U.S. Cl. ................................ 369/13.33; 369/13.13; 369/112.01
(58) Field of Search ........................... 369/13.33, 13.13, 369/13.32, 13.24, 44.11, 112.2, 112.23, 112.24, 112.01

(56) References Cited

U.S. PATENT DOCUMENTS

| | | | |
|---|---|---|---|
| 5,883,872 A | | 3/1999 | Kino |
| 6,118,748 A | * | 9/2000 | Morimoto .................... 369/112 |
| 6,130,864 A | * | 10/2000 | Burroughs .................... 369/13 |
| 6,160,769 A | * | 12/2000 | Ohnuki et al. .................. 369/13 |
| 6,256,267 B1 | * | 7/2001 | Hatam-Tabrizi ............. 369/13 |
| 6,320,708 B1 | * | 11/2001 | Ueyanagi et al. ........... 359/824 |
| 6,327,121 B1 | * | 12/2001 | Nagasawa et al. ..... 360/324.11 |

FOREIGN PATENT DOCUMENTS

EP 0 915 458 A2 5/1999

OTHER PUBLICATIONS

R.L. White, *Progress and Prospects In Magnetic Data Storage*, Technical Digest of MORIS '99, 11–A–03, pp. 6–7, 1999.

*Nikkei Electronics*, No. 734, pp. 35–42, Jan. 1999.

H. Kubota, *Optics*, Iwanami Shoten, pp. 282–285.

M. Onoue, *Optical Disk Technology*, Radio Gijutsu Co., pp. 94–97.

D. Rugar, *Magnetooptic Direct Overwrite Using a Resonant Bias Coil*, IEEE Transactions on Magnetics, vol. 24, No. 1, pp. 666–669, 1988.

C.W. Lee et al., *Feasibility Study on Near Field Optical Memory Using a Catadioptric Optical System*, Paper Presented at Optical Data Storage Topical Meeting, 1998.

* cited by examiner

*Primary Examiner*—Tan Dinh
(74) *Attorney, Agent, or Firm*—Oliff & Berridge PLC

(57) ABSTRACT

The present invention provides a method for fabricating a recording/reproducing head, a recording/reproducing disk drive, and a magnetic sensor that provide a high recording density and a high transfer rate. A detection part of a bottom side of a magnetic sensor is almost equal in shape to a recorded mark. Thereby, while a signal is being reproduced from one recording mark, signals of the other recorded marks are not picked up, so that resolution is increased. Since output signals of the magnetic sensor are symmetrical between preceding and following stages and distortion is reduced, the amount of jitter during conversion into a digital signal is reduced, so that information can be correctly reproduced.

24 Claims, 20 Drawing Sheets

*FIG.9A*        *FIG.9B*
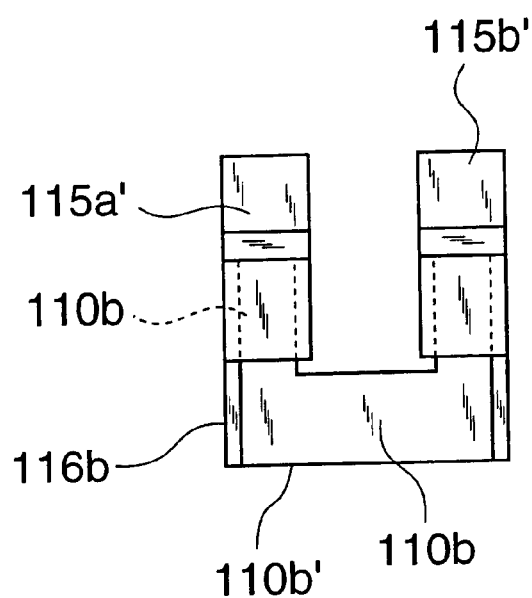
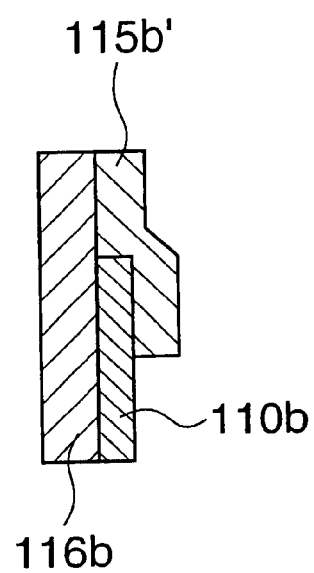

FIG.23
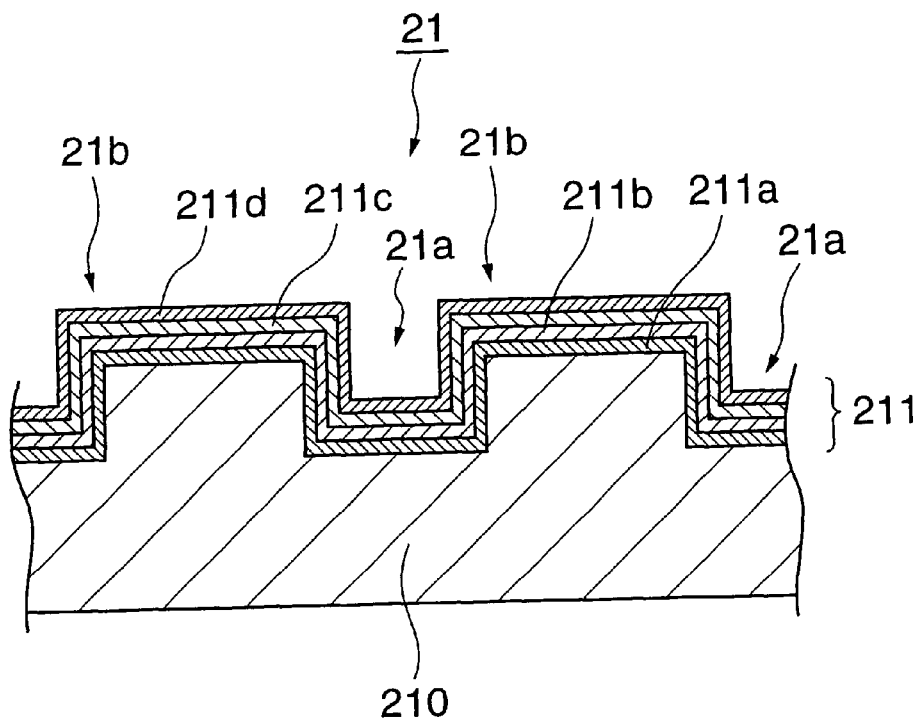
FIG.24A
FIG.24B
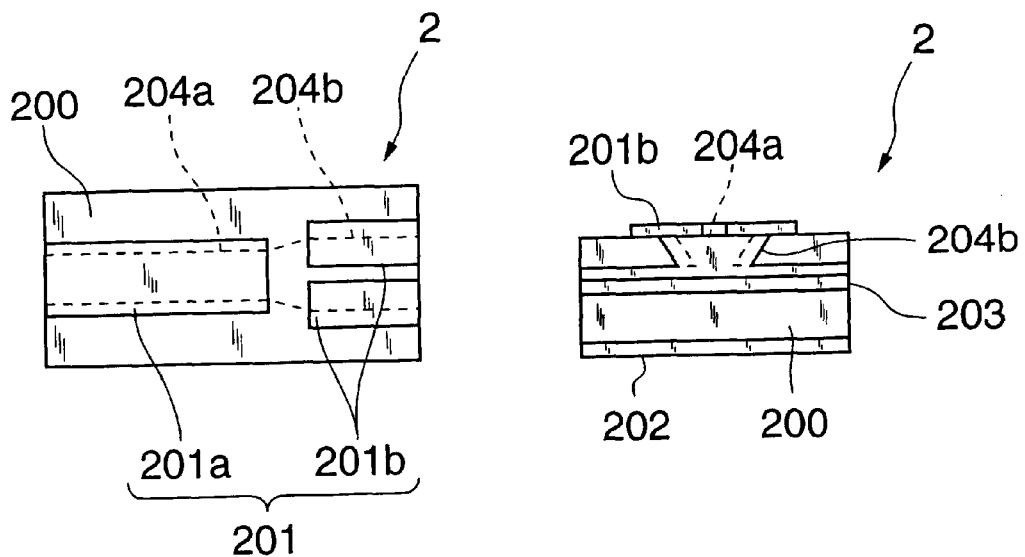

RECORDING/REPRODUCING HEAD, RECORDING/REPRODUCING DISK DRIVE, AND METHOD FOR FABRICATING MAGNETIC SENSOR

BACKGROUND OF THE INVENTION

1. Field of the Invention

The present invention relates to a recording/reproducing head, a recording/reproducing disk drive and a method for fabricating a magnetic sensor, which are used for a magnetic recording with heating a recording part by light irradiation (Optically Assisted Magnetic (OAM) recording) and reproducing by a magnetic sensor. More particularly, the invention relates to a recording/reproducing head, the recording/reproducing disk drive and a method for fabricating the magnetic sensor, which enable high density recording and high rate data transfer.

2. Description of the Prior Art

For use with hard disk drives (HDD), which perform recording and/or reproducing on magnetic recording films with a magnetic head, magnetoresistive (MR) sensors using magnetoresistance for reproduction or giant-magnetoresistive (GMR) sensors with higher sensitivity and higher resolution (these sensors are collectively referred to as magnetic sensors) have been developed. The recording density has been increased approximately 60% a year in recent years. However, it has turned out recently that the surface density has a limit of approximately 30 Gbits/(inch)$^2$ because of the super paramagnetic effect: the magnetization direction of a magnetic domain is inverted in the opposite directions by magnetization of adjacent magnetic domains due to thermal disturbance (R. L. White, Tech. Digest of MORIS'99, 11-A-03(1999) P.7).

The optically assisted magnetic (OAM) recording method is proposed as a promising solution to this problem. By this method, the recording is performed by applying magnetic fields and beam spots onto magnetic recording films or magneto-optic recording films and the reproducing is performed with a magnetic sensor such as GMR sensor. The recording is performed with heating a magnetic film by the irradiation of a laser beam for decreasing the magnetization strength of the magnetic films. This method allows recording on a magnetic film of high magnetization, so the magnetization inversion at room temperatures can be avoided. A conventional recording/reproducing disk drives adopting the OAM recording method is described in the literature, "Nikkei Electronics, No. 734, (99.1.11), P.35", for example FIG. 27 shows the recording/reproducing disk drive. The recording/reproducing disk drive 1 has: a semiconductor laser 2 that emits laser beams 3; a polarized beam splitter 33 that separates the laser beam from the semiconductor laser 2 and reflected beam from the recording/reproducing disk 8; a quarter wavelength plate 34 that converts the laser beam 3 from the semiconductor laser 2 to circular polarized beam; a condense lens 4' that condenses the laser beams 3 from the semiconductor laser 2 after passing through the polarized beam splitter 33 and the quarter wavelength plate 34; a hemispherical solid immersion lens (SIL) 6 that condenses the laser beams 3 from the condense lens 4', incident from a hemispherical incident surface 6a, to form a beam spot 9a on a beam-condense surface 6c; a flying slider 12 that supports the SIL 6; a coil 10 for modulating magnetic fields, provided in the circumference of the beam spot 9a of the flying slider 12; and a magnetic sensor 11 comprising a GMR sensor.

By the recording/reproducing disk drive 1, the information is recorded in following steps: the semiconductor laser 2 emits a laser beam 3 in a pulse shape; a beam spot 9a is formed on the beam-condense surface 6c of the SIL 6 by the condense lens 4'; a near field wave 9b leaked from the beam-condense surface 6c irradiates a magneto-optic recording film 8b on the recording/reproducing disk 8 to heat the magneto-optic recording film 8b, and at the same time the information is recorded by applying a modulating magnetic field by a coil 10 corresponding to the information. This is referred to as laser-pumped modified field magnetic (LP-MFM) recording. The LP-MFM recording enables recorded mark to be formed shorter than the beam spot diameter. Information is reproduced by scanning the recording/reproducing disk 8 by the magnetic sensor 11 with a magnetic-resistive film used as a detection part. According to the recording/reproducing disk drive 1, since the beam spot 9a can be reduced inversely proportional to the refractive index of the SIL 6, minute magnetic domains of approximately 0.3 μm wide can be formed, so the higher recording density can be achieved.

FIG. 28 shows the above-described LP-MFM recording and the reproduction with the magnetic sensor 11. The LP-MFM recording is performed, as shown in FIG. 28. The laser beam 3, which is turned on and off like a pulse to be adapted to a mark interval. The recording/reproducing disk 8 is moved in the track direction X relative to the magnetic sensor 11. The information is recorded by inverting the direction of applied external magnetic fields corresponding to the basis of recording information. Since circular marks 81 recorded first on a recording track 80 are partially erased due to recording of the next inverted magnetic field, crescent recording marks 81 are formed in the tail of near field wave 9b as shown in FIG. 28. Because the mark length L is determined only by a recording frequency and disk rotation speed, it can be reduced to the size of magnetic particles of the recording film 8b. by increasing the recording frequency.

However, according to the conventional recording/reproducing disk drive 1, the detection part 11a of the magnetic sensor 11 has rectangular shape as shown in FIG. 28. If the crescent marks 81 was scanned with the sensor 11 and the magnetic sensor proceeded to the mark 81 after passing above the central portion of the preceding mark 81, the tail portion of the preceding mark 81 and the present mark 81 would overlapped. So the resolving power would be decreased when the output signal of the magnetic sensor 11 is reproduced on the basis of the reference level S. Further, the output signal of the magnetic sensor 11 is distorted because of the asymmetry between the preceding and following portion of a mark, so the jitter is increased, then the information cannot be correctly reproduced. This phenomenon becomes conspicuous by reducing the mark length L. Although minute recorded mark can be formed during recording, a recording density cannot practically be increased even by use of the LP-MFM recording method because of the limit of the reproducing resolution. The above-mentioned limit of the recording density also limits the transfer rate.

FIG. 29 shows the dependence of the output signals of the magnetic sensor on the mark length L, when the thickness (length in the track direction X) T of the detection part 11a of the magnetic sensor 11 is constant. In this example, the size of a beam spot is 0.2 μm and the length of the detection part 11a of the magnetic sensor 11 is 0.07 μm. As seen from this figure, when the mark length L becomes smaller than the size of the near field wave 9b, output signals is rapidly reduced. Since the jitter is increased at the same time, the reproducible mark length L actually becomes approximately 0.15 μm. Although the shorter marks 81 can be formed by LP-MFM recording and the thickness T of the detection part 11a of the magnetic sensor 11 is thin, these advantages cannot be effectively used.

SUMMARY OF THE INVENTION

The present invention provides a recording/reproducing head, a recording/reproducing disk drive which provide a high recording density and a high transfer rate, and a fabrication method of a magnetic sensor used for the head.

The present invention provides a recording/reproducing head, which records recorded mark on recording/reproducing disks by applying magnetic fields and irradiating near field wave and detects magnetic fields from the recorded mark with a magnetic sensor. The head includes a laser beam emitting unit that emits a laser beam, an optical system including a transparent condensing medium having an incident surface on which the laser beam is incident and a condense surface on which the laser beam incident on the incident surface is condensed. The optical system guides the laser beam from the laser beam emitting unit to the incident surface, forms a beam spot by condensing the laser beam on the condense surface, and irradiates the near field wave from the beam spot onto the recording/reproducing disks. The head further includes a magnetic field applying unit, provided near a position where the beam spot is formed, that applies the magnetic fields, and a detection part of the magnetic sensor is almost equal in shape to the recorded mark.

With the above-described configuration, by making the detection part of the magnetic sensor almost equal in shape to the recorded mark, while a signal from one recording mark is being reproduced, signals of the other recorded marks are not picked up, so that resolution is increased. Since an output signal of the magnetic sensor is symmetrical between preceding and following portion and distortion is reduced. The amount of jitter during conversion into a digital signal is reduced, so that information can be correctly reproduced. As a result, a recording density can be increased and a transfer rate is improved more rapidly.

The present invention also provides a recording/reproducing disk drive having the recording/reproducing head described above.

The present invention also provides a recording/reproducing disk drive having plural recording/reproducing disks coaxially disposed at a predetermined interval and plural recording/reproducing heads that record recorded mark on the plural recording/reproducing disks by applying magnetic fields and irradiating near field wave and detect magnetic fields from the recorded mark by a magnetic sensor. Each of the recording/reproducing heads is that described above. The disk drive further has a magnetic field applying unit, provided near a position where the beam spot is formed, that applies the magnetic field, and a detection part of the magnetic sensor is almost equal in shape to the recorded mark.

With the above-described construction, a transfer rate is increased by using plural recording/reproducing heads that perform recording and reproducing on plural recording/reproducing disks.

The present invention also provides a method for fabricating a magnetic sensor that detects magnetic fields from crescent recorded marks having a predetermined curvature, recorded on recording/reproducing disks. The method includes the steps of forming a depression constituting part of a cylindrical surface on a substrate and depositing multi-layer spin valve films on the depression to form a detection part for detecting the magnetic fields, having a curvature almost equal to that of the predetermined curvature.

With the above-described construction, it becomes possible to fabricate a magnetic sensor including a detection part having a curvature almost equal to that of recorded mark.

BRIEF DESCRIPTION OF THE DRAWINGS

Preferred embodiments of the present invention will be described in detail based on the followings, wherein:

FIG. 9A is a front view showing another example of the magnetic sensor of the second embodiment, and FIG. 9B is a sectional view;

FIG. 23 is a main sectional view of the recording/ reproducing disk of the ninth embodiment;

FIG. 24A is a plane view of the recording/reproducing disk drive of the ninth embodiment, and FIG. 24B is a sectional view thereof;

DESCRIPTION OF THE PREFERRED EMBODIMENTS

Figure 1A:
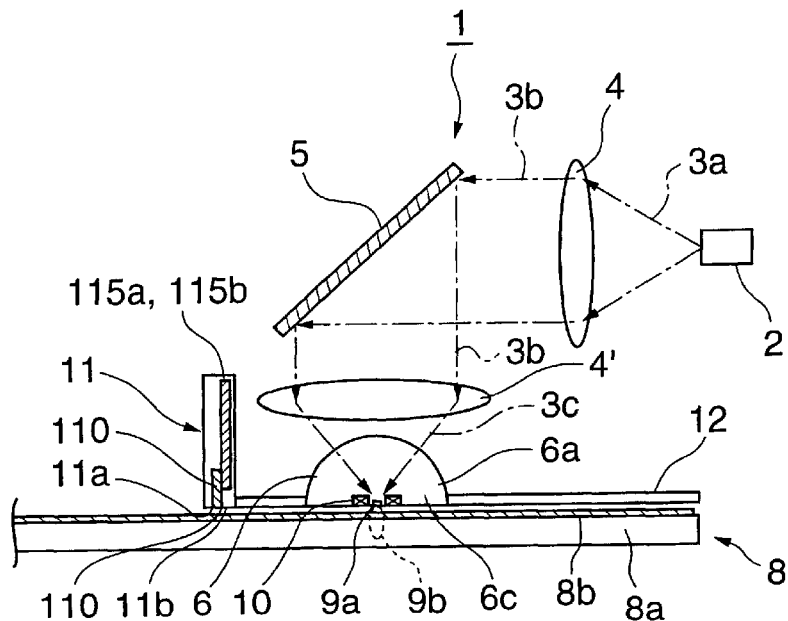
FIG. 1A is a side view of a recording/reproducing head of a first embodiment of the present invention.
Figure 1B:
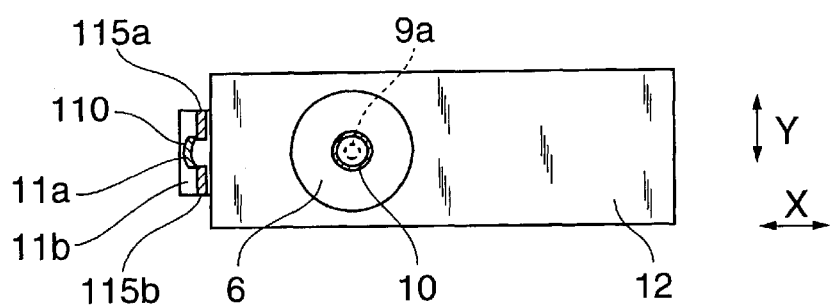
FIG. 1B is a bottom view thereof.
Figure 1C:
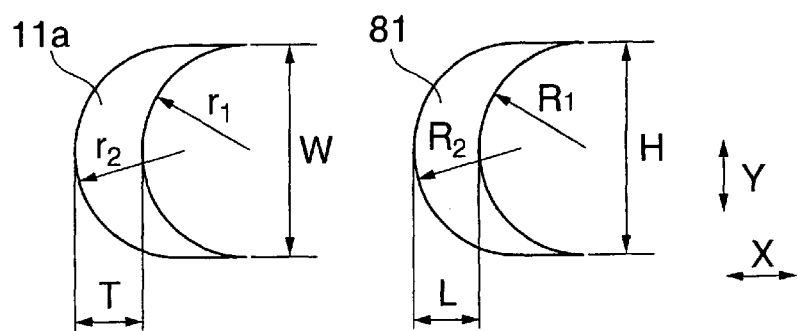
FIG. 1C shows main parts thereof.

FIG. 1 shows a recording/reproducing head according to a first embodiment of the present invention: FIG. 1A, a side view of the recording/reproducing head; FIG. 1B, a bottom view; and FIG. 1C, main parts. In the figures, X designates a track direction and Y indicates a direction orthogonal to the track direction. The recording/reproducing head 1 has: a semiconductor laser 2 that emits a laser beam 3a; a collimator lens 4 that shapes the laser beam 3a from the semiconductor laser 2 to collimated beam 3b; a folding mirror 5 which folds the collimated beam 3b from the collimator lens 4 at almost right angles; a condense lens 4' that condenses the collimated beam 3b from the folding mirror 5; a transparent condensing medium 6 which condenses convergent beam 3c from the condense lens 4' and propagates it, as a near field wave 9b, to a magneto-optic recording film 8b formed on a substrate 8a of a recording/ reproducing disk 8; a coil 10 which applies a modulated magnetic filed corresponding to recording information to the recording film 8b to which the near field wave 9b was propagated; a magnetic sensor 11 which reproduces a recording signal by detecting a leak magnetic field from recorded mark 81 of the recording film 8b as a change of voltage; and a flying slider 12 that supports at least the condense lens 4', the folding mirror 5, and the transparent condensing medium 6, and flies and runs on the recording/ reproducing disk 8.

The transparent condensing medium 6, which is a hemispherical solid immersion lens, has a hemispherical incident surface 6a to which the convergent beams 3c are perpendicularly incident without being refracted, and a condense surface 6c through which the convergent beams 3c are condensed to form a beam spot 9a.

The diameter $D_{1/2}$ (the diameter of the beam spot 9a at a position where the light strength becomes half) of the beam spot 9a on the condense surface 6c is given by the following expression:

$$D_{1/2}=k\cdot\lambda/(n\cdot NAi) \quad (1)$$

where k is a proportionality constant, approximately 0.5 for Gauss beams, λ is the wavelength of the incident laser beams 3c, n is the refractive index of the transparent condensing medium 6, and NAi is the numerical aperture within the transparent condensing medium 6, which, in this embodiment, is equal to the NA of the condense lens 4' because of the absence of refraction on the incident surface 6a. During the recording, the recording film 8b is closed to the condense surface 8c to a fraction of the wavelength of the laser beams 3 to avoid the spread of the near field wave 9b. So the size of the near field wave 9b becomes almost equal to the diameter of $D_{1/2}$ of the beam spot 9a. Since the recording threshold is set a half of the light intensity at the center of the beam usually, the size of the recorded mark is approximately $D_{1/2}$. In this embodiment, GaAlInP red laser (wavelength 630 nm) is used as the semiconductor laser 2 and heavy flint glass (refractive index 1.91) is used as the transparent condensing medium 6, and the NA of the condense lens 4' is 0.8. In this case, $D_{1/2}$ is approximately 0.2 μm and the size of the recorded mark 81 is also approximately 0.2 μm.

The magnetic sensor 11 has a detection part 11a on a bottom side 11b, and uses a GMR sensor which primarily comprises: spin valve films 110 as magnetic resistive films changing in resistive depending on the direction of a magnetic field; and a pair of electrodes 115a and 115b outputting resistive changes of the spin valve films 110 as voltage changes. The shape of the detection part 11 on the bottom 11b of the magnetic sensor 11 is almost equal to that of recorded mark 81 formed on the recording film 8b of the recording/reproducing disk 8 by the near field wave 9b and a modulated external field. In this embodiment, the detection part 11a has a shape of circular arc as shown in FIG. 1C, and is constructed to satisfy the following relation:

$$r_1=R_1=r_2=R_2, W\leq H$$

where $r_1$ is the inside radius of the circular arc, $r_2$ is the outside radius thereof, T is the thickness at the center in the track direction X, W is the thickness in the direction Y orthogonal to the track direction X, $R_1$ is the inside radius of the recorded mark 81, $R_2$ is the outside radius thereof, L is the length at the center in the track direction X, and H is the thickness in the direction Y orthogonal to the track direction X. In the relation between T and L, although T=L is assumed in this embodiment, T>L is also possible. T≤L is desirable in terms of signal strength.

Figure 2:
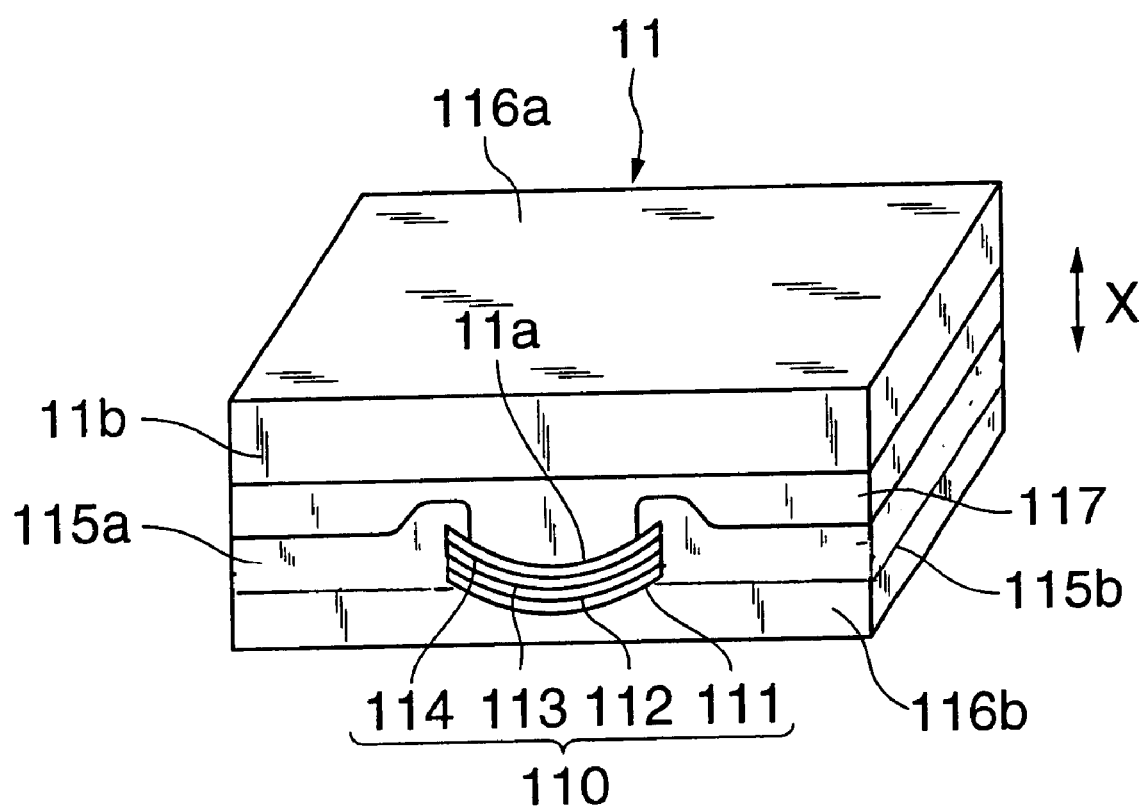
FIG. 2 is a perspective view of a magnetic sensor of the first embodiment.

FIG. 2 shows the magnetic sensor 11 of this embodiment. In the magnetic sensor 11, a pair of electrodes 115a and 115b are connected at each end of the spin valve films 110 having the detection part 11a in the shape of a circular arc; the spin valve films 110 and one of the pair of electrodes 115a and 115b are covered with a spacer layer 117 having magnetic shielding effects; and these are sandwiched between magnetic shielding films 116a and 116b to shield magnetic fields from other than the recorded mark.

The spin valve film 110, formed of multiple GMR (giant magnetoresistive) films, as shown in FIG. 2, has: an antiferromagnetic layer 111 made of Fe—Mn and the like; and two magnetic layers made of Ni—Fe and the like, i.e., a pin layer 112 and a free layer 114, which are formed on top of the antiferromagnetic layer 111 and sandwich a nonmagnetic layer 113 made of Cu and the like. When the free layer 114 is magnetized in line with the direction of the pin layer 112 by magnetic fields, a low resistance is generated; a high resistance is generated when magnetized in the opposite direction. The resistance change is detected as a change of voltage applied to the electrodes 115a and 115b connected at each end of the spin valve film 110. The sensor length in the track direction X, almost determined by the thickness of the free layer 114, is approximately 0.07 μm in this embodiment. This is a fraction of the spot size of the near filed beam spot 9b, so that a recording density can be significantly increased by reproduction by means of this sensor. The spin valve film 110, as shown in FIG. 2, is formed in the shape of a circular arc, and the curvature of the circular arc is made almost equal to that of the recorded marks. That is, in this embodiment, the curvature radius of the spin valve 110 is 0.1 $\mu$m, which is almost equal to that of the near field wave 9b. The above-described film structure is an example; any film structure to exhibit the magnetoresistive effect can be used.

FIG. 3 shows the process of fabricating the magnetic sensor 11 of this embodiment. The magnetic sensor 11 is fabricated using a photolithography process, and the films are deposited using sputtering and partly removed using dry etching.

Figure 3A:
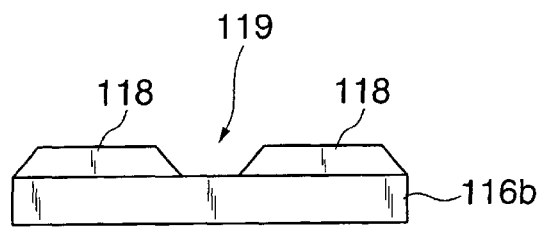
FIGS. 3A to 3F show processes of fabricating the magnetic sensor of the first embodiment.

First, as shown in FIG. 3A, a window 119 is formed by a photo-resist film 118 at a spin valve film formation position of the lower magnetic shielding film 116b.

Figure 3B:
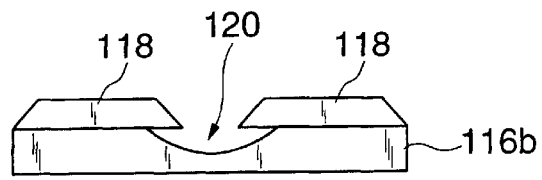

Next, as shown in FIG. 3B, isotropic dry etching is performed using a chloric gas such as $CH_2C_{12}$ so that a depression 120 of a shape (cylindrical-shaped) forming part of a cylindrical surface is formed in the magnetic shielding film 116b.

Figure 3C:
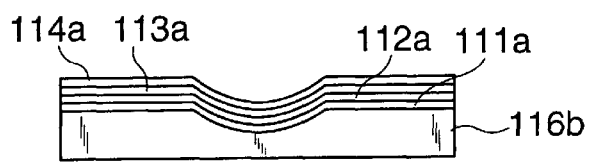

Next, as shown in FIG. 3C, after the resist film 118 is removed, an antiferromagnetic layer 111a, a pin layer 112a, a nonmagnetic layer 113a, and a free layer 114a are successively deposited.

Figure 3D:
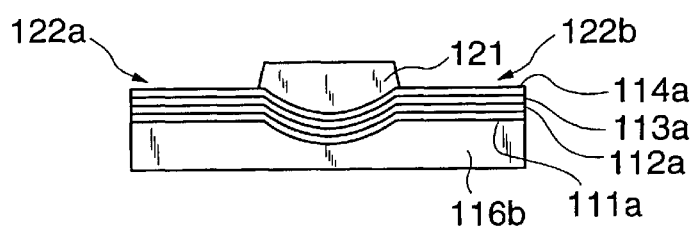

Next, as shown in FIG. 3D, a spin valve film formation position is protected with a resist pattern 121.

Figure 3E:
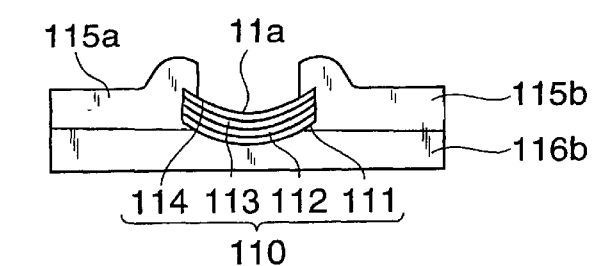
Figure 3F:
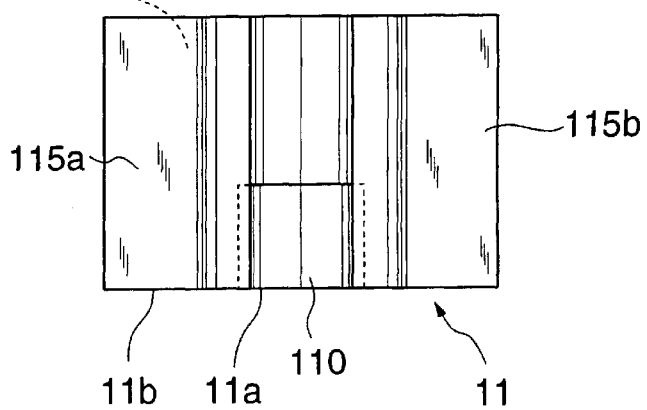

Next, after unnecessary portions 122a and 122b of the four layers 111a, 112a, 113a, and 114a are removed, an electrode film is deposited by sputtering (not shown), the electrode film (not shown) on the resist pattern 121 is lifted off by dissolving the resist pattern 121, and thereby, as shown in FIGS. 3E and 3F, the spin valve film 110 and the electrodes 115a and 115b are formed to complete the magnetic sensor 11.

Although, in the above-described embodiment, dry etching is used to form the spin valve film 110, the spin valve film may be formed by using a resist film and performing lift-off processing. Since this allows self-alignment formation of the cylindrical-shaped depression 120 and the spin valve film 110, both are formed with highly accurate alignment. Although, in the above-described embodiment, dry etching is used to form the cylindrical-shaped depression 120, the present invention is not limited to this; wet etching or focused ion beam (FIB) etching may be used. Depression formation by FIB is suitable because it eliminates the need to perform patterning by a photo resist film at etching positions and enables fine patterns to be formed.

Figure 4:
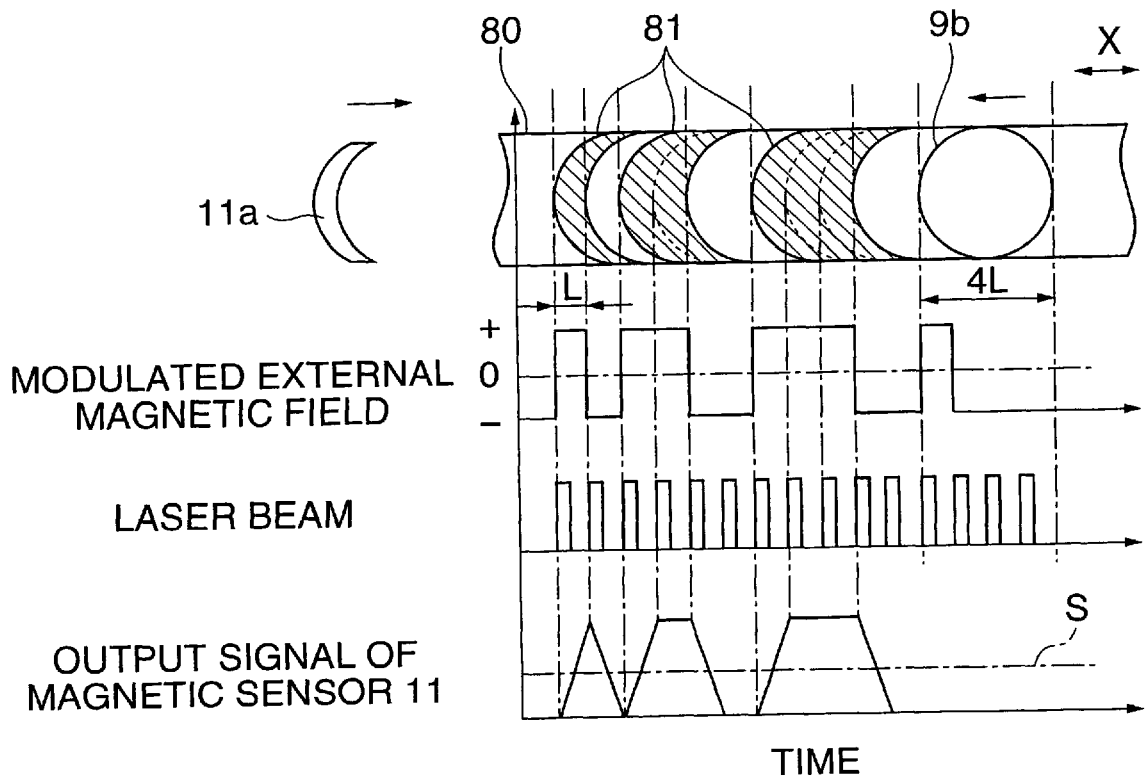
FIG. 4 shows recording and reproducing operations of the first embodiment.

FIG. 4 shows recording and reproducing operations of the first embodiment. First, recording operations are described. The semiconductor laser 2, as shown in FIG. 4, emits, in the form of pulse, the laser beam 3a having a predetermined light strength required for recording, synchronously with a synchronous signal from a driving part not shown. The pulse-shaped laser beam 3a are shaped to the collimated beams 3b by the collimator lens 4 and enter the incident surface 6a of the transparent condensing medium 6. The laser beams 3c incident to the incident surface 6a are condensed on the condense surface 6c to form a beam spot 9a thereon. Light condensed on the beam spot 9a leaks as the near field wave 9b, propagates to the recording film 8b of the recording/reproducing disk 8, and heats that portion. At the same time, as shown in FIG. 4, an external magnetic field is modulated by applying a current through a coil 10 in accordance with recording information. Recorded marks 81 are formed on a recording track 80. In this case, since part of the recorded mark 81 formed by a magnetic field of the plus direction is erased by the next inverted magnetic field, the recorded marks 81 are formed in a crescent shape like the diagonally shaded areas in FIG. 4. Thus, information is recorded by the near field wave 9b and the magnetic field modulated by the coil 10 in combination.

Next, reproducing operations are described. The semiconductor laser 2 emits the laser beam 3a having a predetermined light strength (lower than that during recording) required for reproduction in the form of pulse, synchronously with a synchronous signal from the driving part not shown. The pulse-shaped laser beam 3a are shaped to the collimated beams 3b by the collimator lens 4 and enter the incident surface 6a of the transparent condensing medium 6. The laser beam 3c incident to the incident surface 6a are condensed on the condense surface 6c to form the beam spot 9a thereon. Light condensed on the beam spot 9a leaks as the near field wave 9b and propagates to the recording layer 8b of the recording/reproducing disk 8. By moving the magnetic sensor 11 along the recording track 80 relative to the recording/reproducing disk 8, the magnetic sensor 11, as shown in FIG. 4, outputs a signal corresponding to a leak field from the recorded mark 81. Since the detection part 11a of the magnetic sensor 11, as shown in FIG. 4, is formed in the shape of a circular arc having almost the same curvature as the recorded mark 81, the magnetic sensor 11 moves on the recorded marks 81 so that both overlap at the same time and separate at the same time in the track direction X. Accordingly, a signal output from the magnetic sensor 11 increases linearly with increasing overlapping portions of them, becomes maximum when their whole positions overlap, and decreases linearly with the increasing amount of mismatch of their positions. Such an output signal of the magnetic sensor 11 is converted into a digital reproduction signal on the basis of a reference level S.

Figure 5:
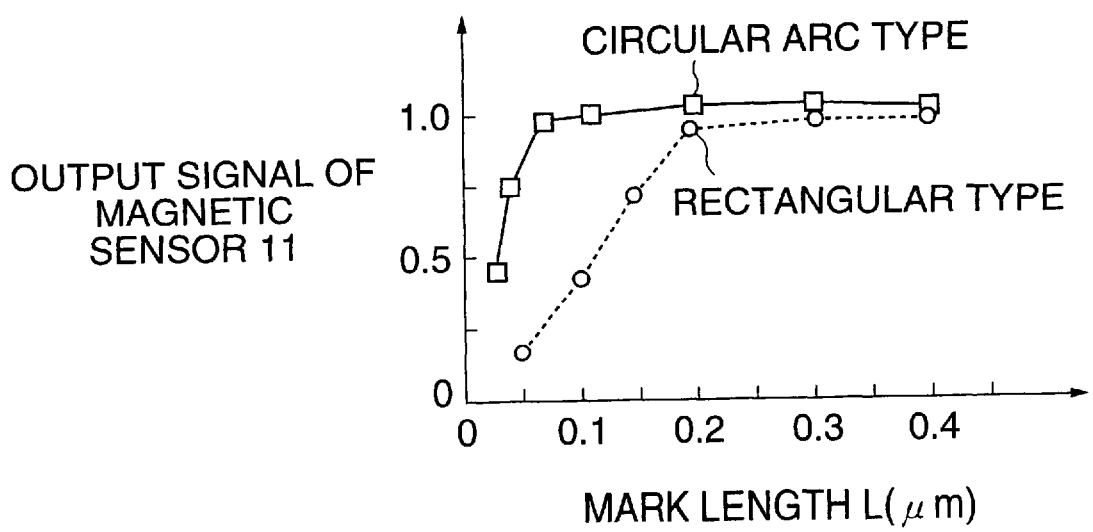
FIG. 5 shows comparison between the first embodiment and a conventional example.

FIG. 5 shows comparison in the shape of the detection part 11a of the magnetic sensor 11. When the detection part 11a of the magnetic sensor 11 is rectangular, the upper limit of mark length L is 0.2 $\mu$m, while when the detection part 11a of the magnetic sensor 11 is in the shape of a circular arc, recorded mark up to 0.05 $\mu$m in the mark length L can be reproduced without a problem by the magnetic sensor 11 of approximately 0.07 $\mu$m in thickness T.

According to the above-described recording/reproducing head 1 of the first embodiment, since the curvature of the detection part 11a of the magnetic sensor 11 is defined to be almost equal to that of the crescent recorded mark, while a signal from one recording mark 81 is being reproduced, signals of other recorded marks 81 are not picked up, so that resolution is increased. Since an output signal of the magnetic sensor 11 is symmetrical between preceding and following stages and distortion is reduced, the amount of jitter during conversion into a digital signal is reduced, so that information can be correctly reproduced. As a result, a recording density can be substantially increased even when the LP-MFM recording method is used.

Furthermore, since signal reproducible mark length L does not depend on a beam spot diameter, the mark length L can be made minute even if a relatively large beam spot is used, so that a high transfer rate can be achieved without increasing the rotation speed of the recording/reproducing disk.

Although, in this embodiment, the hemispherical, transparent condensing medium 6 is used, a truncated superspherical solid immersion lens having a condense surface 6c at a distance of r/n (r is a radius and n is a medium refractive index) from its center may be used. The same effect as in this embodiment could be obtained using the truncated transparent condensing medium.

Figure 6:
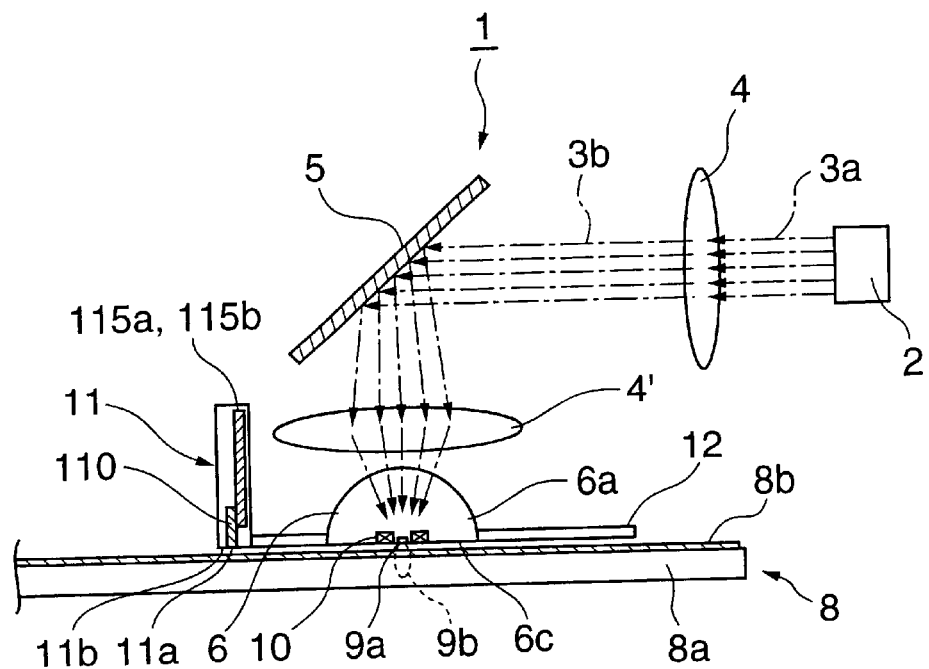
FIG. 6 is a side view of the recording/reproducing head of a second embodiment of the present invention.

FIG. 6 shows a recording/reproducing head according to a second embodiment of the present invention. In order that recording or reproducing can be performed on plural recording tracks at a time in the first embodiment, the recording/reproducing head 1 uses the magnetic sensor 11 having, e.g., the semiconductor laser 2 that outputs five laser beams; five modulation coils 10; and five spin valve films 110. Others are constructed as in the first embodiment. FIG. 6 shows one coil 10 and one spin valve film 110.

The semiconductor laser 2 emits five laser beams 3a at a beam interval of 100 µm. When the five laser beams 3a are condensed on the condense surface 6c via the collimator lens 4, the mirror 5, and the condense lens 4' (in FIG. 6, only the central line of each laser beam is shown), the interval of the beam spot 9a on the condense surface 6c in the direction Y orthogonal to the track direction X is approximately 20 µm.

Figure 7:
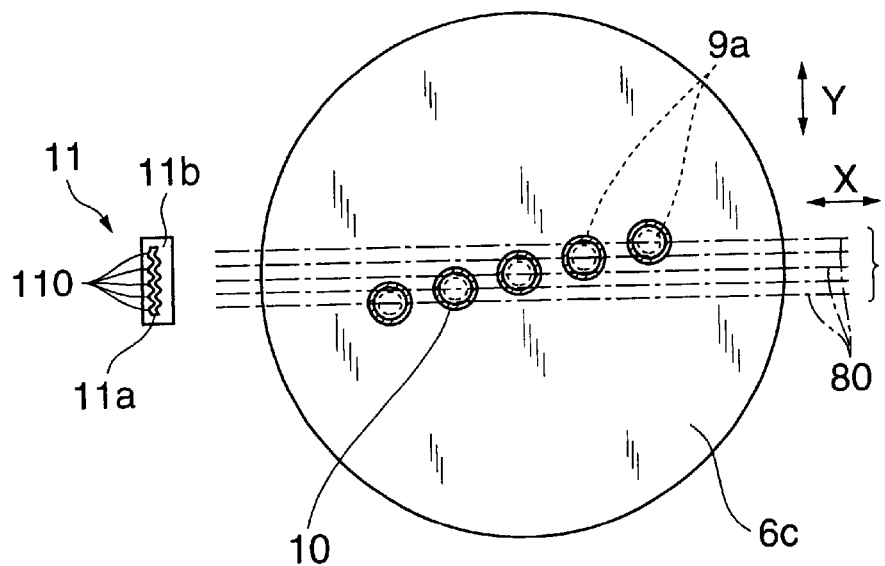
FIG. 7 is a bottom view of the recording/reproducing head of the second embodiment.

FIG. 7 is a magnified view of the bottom of the recording/reproducing head 1 of the second embodiment. For convenience, the near field wave 9b and the coils 10 are magnified. The interval between the tracks 80 is 0.25 µm, and the spot array and the magnetic coil array are arranged in a little tilted position with respect to the tracks 80 as shown in the figure so that the spots 9b lie over the tracks 80.

Figure 8A:
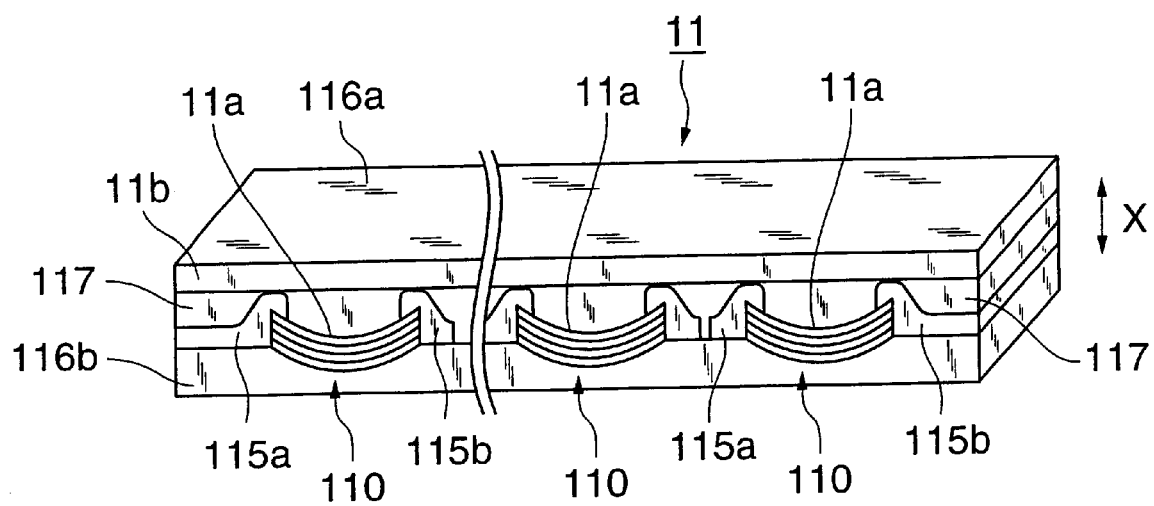
FIG. 8A is a perspective view of the magnetic sensor of the second embodiment.
Figure 8B:
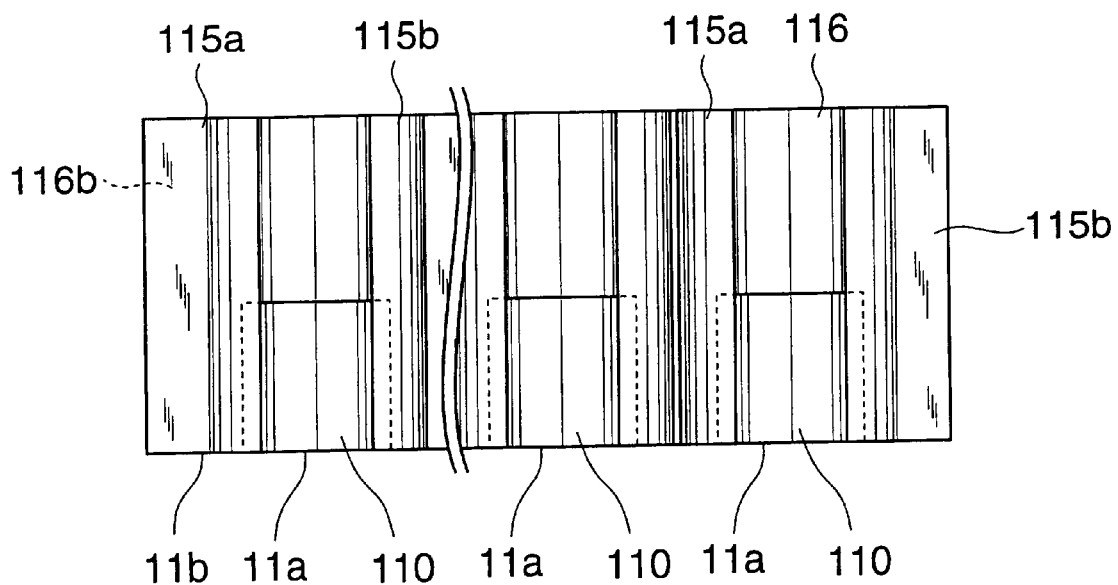
FIG. 8B is a plane view of the main parts thereof.

FIG. 8 shows the magnetic sensor 11 of the second embodiment; FIG. 8A is a perspective view; and FIG. 8B is a front view of main parts. The spin valve films 110 of the magnetic sensor 11 are 0.22 µm each in thickness and are spaced every 0.25 µm, and are constructed in the same was as in the first embodiment. With this construction, information of the five tracks 80 can be reproduced at a time, so that the transfer rate of recording or reproducing can be increased five times as fast. The number of tracks available for recording or reproducing at a time can, without being limited to five tracks in this embodiment, be increased or decreased according to applications.

FIG. 9 shows another example of the magnetic sensor 11 of the second embodiment; FIG. 9A, a front view of main parts; and FIG. 9B, a sectional view of the main parts. As shown in FIG. 9A, the magnetic sensor 11 may be constructed so that the spin valve film 110b has a projection 110b', and electrodes 115a' and 115b' are connected at the base. By this construction, the electrodes 115a' and 115b' can be increased in width and reduced in resistance, while the interval between the spin valve films 110b can be narrowed.

Figure 10A:
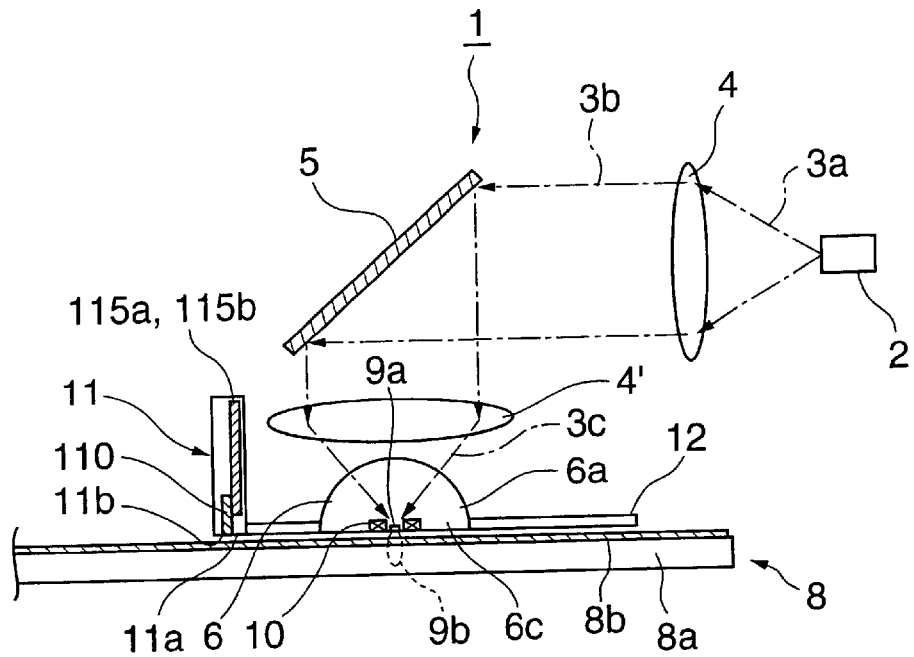
FIG. 10A is a side view of the recording/reproducing head of a third embodiment of the present invention.
Figure 10B:
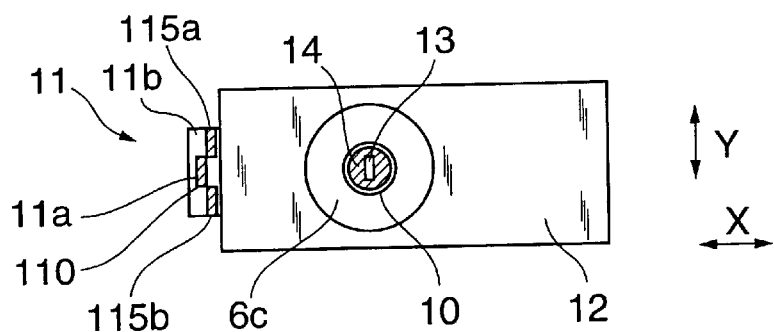
FIG. 10B is a bottom view thereof.

FIG. 10 shows a recording/reproducing head of a third embodiment of the present invention; FIG. 10A, a side view; and FIG. 10B, a bottom view. As shown in FIG. 10B in the first embodiment, the recording/reproducing head 1 is provided with a shading plate 14 at a beam spot condensing position on the condense surface 6c, the shading plate 14 having a rectangular opening 13 and being made of, e.g., a Ti film, and the detection part 11a of the magnetic sensor 11 is rectangularly shaped; other parts are constructed as in the first embodiment. Thereby, the near field wave 9b having a rectangular strength distribution is formed.

Figure 10C:
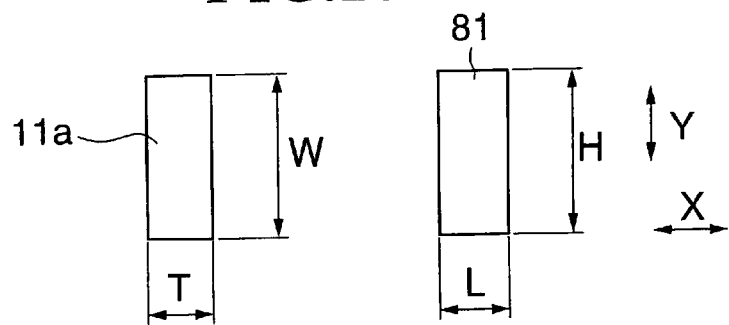
FIG. 10C shows main parts thereof.

The detection part 11a on the bottom side 11b of the magnetic sensor 11 is shaped as shown in FIG. 10C so as to satisfy the following relation:

$$W \leq H$$

where T is the thickness of the detection part 11a in the track direction X, W is the thickness thereof in a direction Y orthogonal to the track direction X, L is the length of the recorded mark 81 in the track direction X, and H is the thickness thereof in the direction Y orthogonal to the track direction X. In the relation between T and L, although T=L is assumed in this embodiment, T<L and T>L are also possible. T≦L is desirable in terms of signal strength.

Figure 11A:
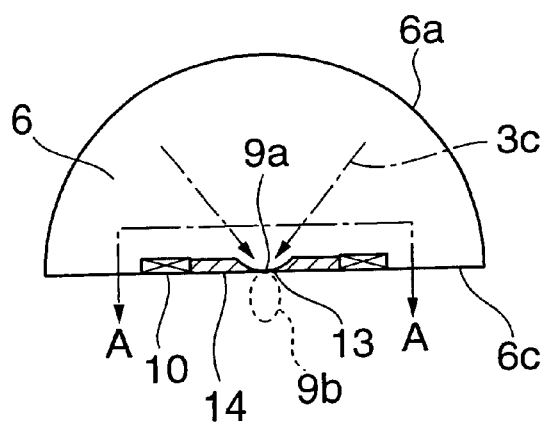
FIG. 11A is a side view of main parts of a beam spot condensing portion on a condense surface.
Figure 11B:
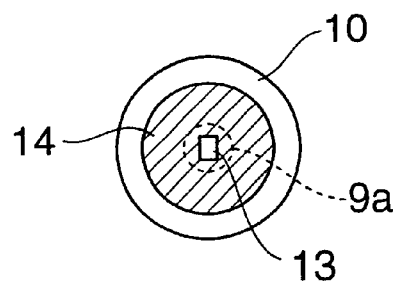
FIG. 11B is a A—A sectional view.
Figure 11C:
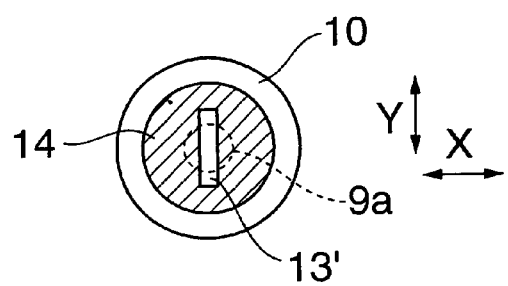
FIG. 11C is a sectional view as viewed from the A—A direction of another example.

FIG. 11 gives details of a beam spot condensing portion on the condense surface 6c of the transparent condensing medium 6 of the third embodiment; FIG. 11A, a side view of main parts; FIG. 11B, a sectional view as viewed from the A—A direction; and FIG. 11C, a sectional view as viewed from the A—A direction to give another example. In the third embodiment, a shading element 14 having a rectangular opening 13 is formed inside the coil 10 and near field wave leaks from only the portion of the opening 13. The opening 13 is formed so as to be smaller in diameter than the beam spot 9a, whereby a minute near field wave 9b can be formed. A rectangular recording mark can be formed by performing recording by means of the near field wave 9b and a magnetic field.

As shown in FIG. 11C, the length of an opening 13' in the direction Y orthogonal to the track direction X may be sufficiently longer than the size of the beam spot 9a. By thus forming the opening 13', the beam spot 9a can be driven in the range of the size in the length direction (Y), enabling rapid tracking. The shading element 14 is not limited to the Ti film used in this embodiment; any film having the shading effect and excellent adhesion may be used, such as Al, Au, Ag, Mo, and W metal films.

Figure 12:
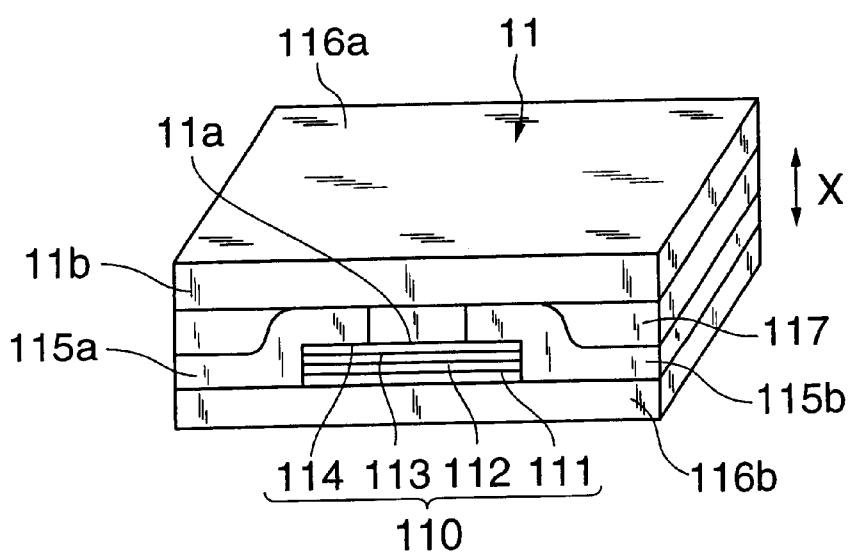
FIG. 12 is a perspective view of the magnetic sensor of the third embodiment.

FIG. 12 shows the magnetic sensor 11 of the third embodiment. Since the spin valve film 110 of the magnetic sensor 11 is formed on the rectangular shielding film 116b, the detection part 11a is also formed in a rectangular shape.

Figure 13:
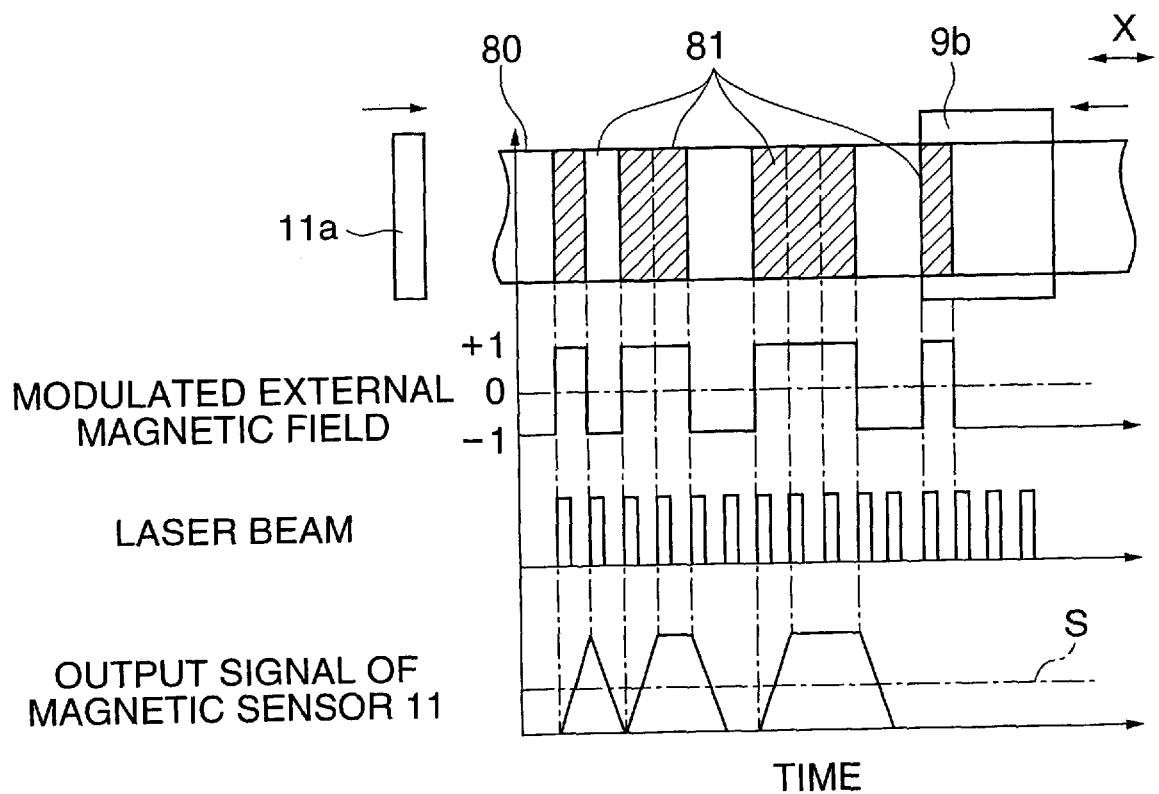
FIG. 13 shows recording and reproducing operations of the third embodiment.

FIG. 13 shows recording and reproducing operations of the third embodiment. Recording operations are performed as shown in FIG. 13 like the first embodiment. By emitting the pulse-shaped laser beam 3a and applying a current to the coil 10 in accordance with recording information to modulate an external magnetic field, the recording/reproducing disk 8 is irradiated with a rectangular near field wave 9b and a rectangular recording mark 81 is formed on the recording track 80. Reproducing operations are performed like the first embodiment. By emitting the pulse-shaped laser beam 3a and irradiating the recording medium 8a of the recording/reproducing disk 8 with the near filed beam spot 9b, and moving the magnetic sensor 11 along the recording track 80 relative to the recording/reproducing disk 8, the magnetic sensor 11, as shown in FIG. 13, outputs a signal corresponding to a leak field from the recorded mark 81.

According to the above-described recording/reproducing head 1 of the third embodiment, since the recorded marks 81 are formed in a rectangular shape corresponding to the rectangular shape of the detection part 11a of the recording/reproducing head 1, resolution is improved with the same effect as in the first embodiment and information can be correctly reproduced. Since the size of the near field wave 9b is made minute by the opening 13, a track pitch is narrowed and a higher density is achieved. Since overlaps of the recorded marks 81, formed by adjacent pulses, can be reduced, the marks can be formed highly densely, enabling rapid recording. The flatness of the spin valve film 110 provides the advantage of being easy to fabricate.

Figure 14:
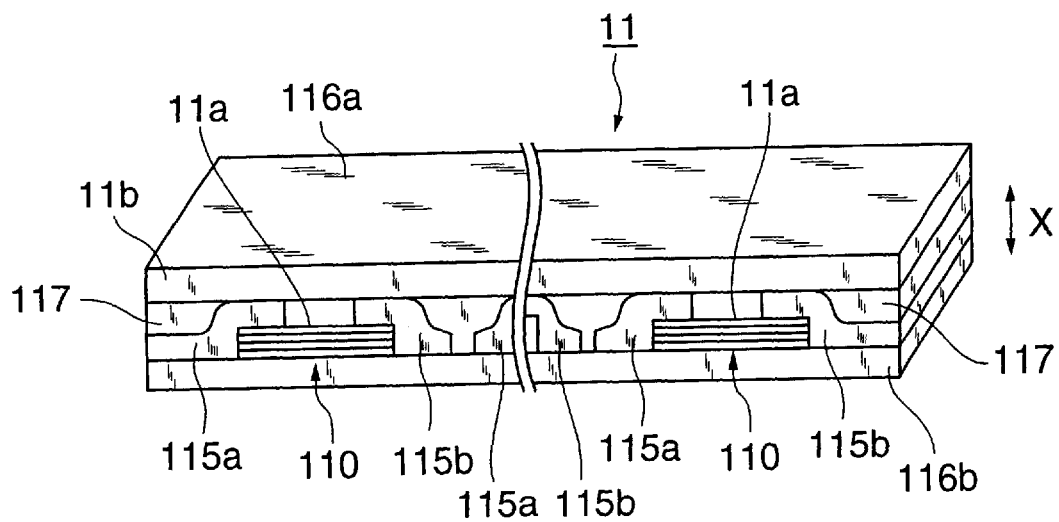
FIG. 14 is a perspective view of the magnetic sensor of the recording/reproducing head of a fourth embodiment of the present invention.
Figure 15:
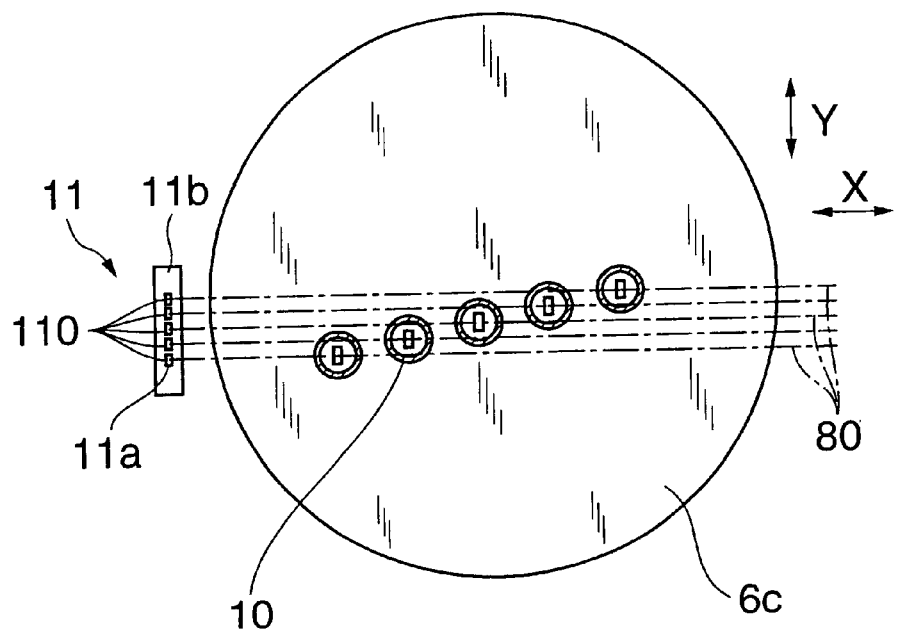
FIG. 15 is a bottom view of the recording/reproducing head of the fourth embodiment.

FIGS. 14 and 15 show the magnetic sensor 11 of a recording/reproducing head of a fourth embodiment of the present invention. The fourth embodiment, like the second embodiment, uses the semiconductor laser 2 and the magnetic sensor 11 that includes plural detection parts 11a having plural spin valve films 110. The detection part 11a of the magnetic sensor 11 is rectangular as shown in FIG. 14. The width and interval of the spin valve films 110 may be the same as those of the magnetic sensor 11 of the second embodiment. The arrangement of the beam spot 9a, the opening 13, and coil 10, and the magnetic sensor 11 may be the same as that of the second embodiment, as shown in FIG. 15. According to the fourth embodiment thus constructed, recording or reproducing can be performed on the plural recording tracks 80 at a time, so that a high transfer rate can be achieved.

Figure 16:
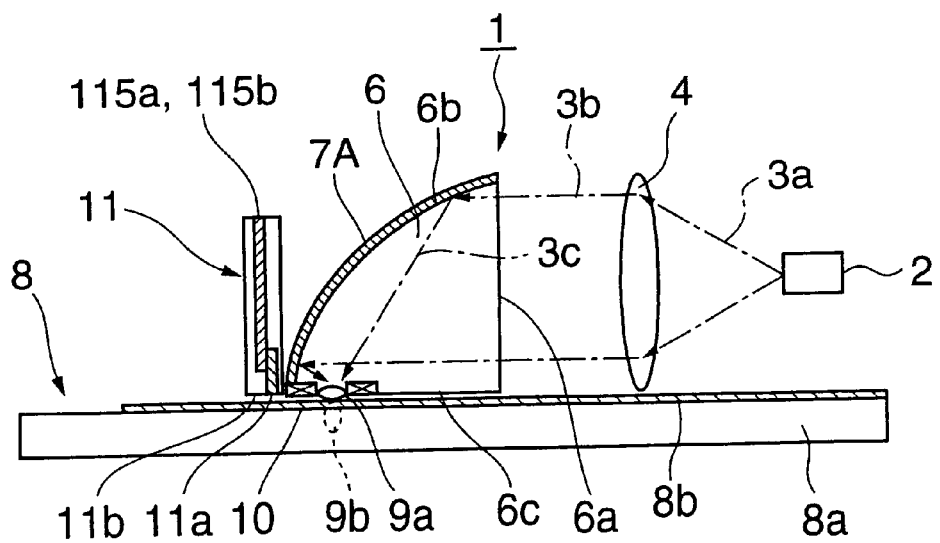
FIG. 16 is a side view of the recording/reproducing head of a fifth embodiment of the present invention.

FIG. 16 shows a recording/reproducing head of a fifth embodiment of the present invention. The recording/reproducing head 1 of the fifth embodiment has the semiconductor laser 2 that emits the laser beam 3a; the collimator lens 4 that shapes the output light 3a of the semiconductor laser 2 to the collimated beam 3b; and the transparent condensing medium 6 to which the collimated beam 3b from the collimator lens 4 are incident, and further has the coil 10 and the magnetic sensor 11 like the first embodiment.

The transparent condensing medium 6 has: an incident side 6a to which the collimated beams are incident; a reflection surface 6b having a condensing effect on the surface of which a reflection film 7A is formed; and the condense surface 6c through which the convergent beams 3c from the reflection surface 6b are condensed to form the beam spot 9a.

Figure 17:
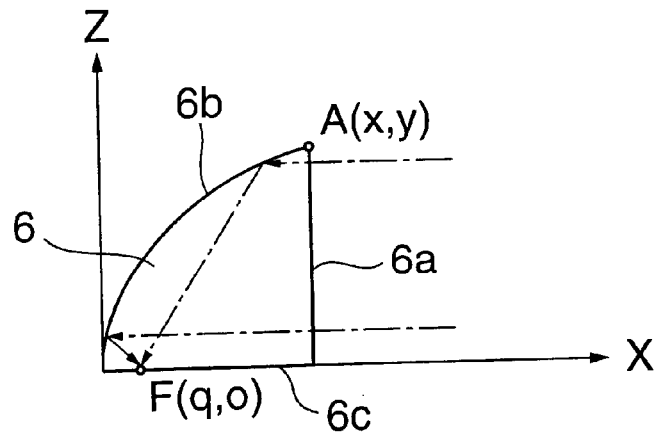
FIG. 17 is a sectional view of the transparent condensing medium of the fifth embodiment.

FIG. 17 shows the cross-sectional shape of the transparent condensing medium 6. The reflection surface 6b of the transparent condensing medium 6 includes part of a paraboloid of revolution to increase the convergence angle of the convergent light 3c inside the transparent condensing medium 6 and form the minute beam spot 9a on the condense surface 6c. Letting the main axis of the cross section (6b) of the revolution paraboloid be X axis, the vertical axis be Z axis, and the coordinates of focal position F be (p, 0), the cross section (6b) is represented as:

$$z^2 = 4px.$$

When a paraboloid of revolution is used to condense light on its focal point, a stigmatic condensing is possible in principle (Optics: by Kubota, Iwanami Shoten, Publishers, P. 283) and the minute spot 9a can be formed by a single condense surface. In this case, the diameter $D_{1/2}$ of the beam spot is given by the expression (1) previously described. There are no special limitations on the height of the transparent condensing medium 6 except for problems on processing; media approximately 0.6 mm high can be fabricated, and therefore the size of the recording/reproducing head of this embodiment can be almost the same as that of the magnetic head 11 used in hard disk drives.

According to the fifth embodiment constructed as described above, recording and reproducing can be performed at a high density like the first embodiment, and recording or reproducing can be performed on plural recording tracks at a time by using the semiconductor laser 2 and the magnetic sensor 11 having the plural detection parts 11a like the second embodiment, so that a transfer rate can be increased. Also, the recording density and the transfer rate can be further improved by providing a rectangular or slit-shape opening at the condensing position of the condense surface 6c like the second embodiment. The reflection surface 6b of the transparent condensing medium 6 may be formed using part of an ellipsoid of revolution.

Figure 18:
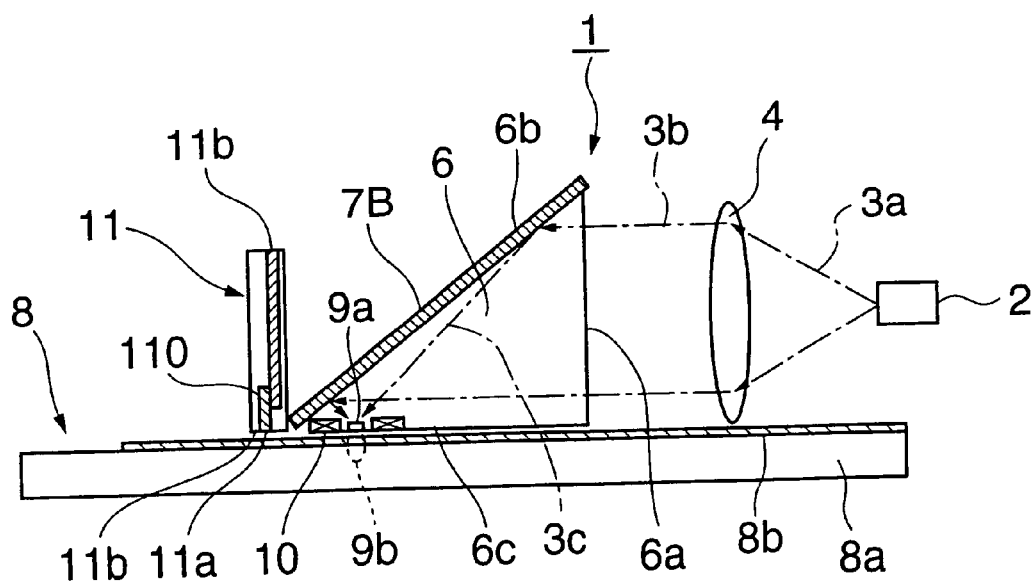
FIG. 18 is a side view of the recording/reproducing head of a sixth embodiment of the present invention.

FIG. 18 shows a recording/reproducing head according to a sixth embodiment of the present invention. The sixth embodiment substitutes the transparent condensing medium 6 whose cross section is in the shape of a right triangle, for the transparent condensing medium 6 in the shape of a paraboloid of revolution in the fifth embodiment, wherein a reflection type hologram 7B is formed on the surface of a slant reflection surface 6b of the transparent condensing medium 6. The reflection type hologram 7B may be a binary hologram or a volume hologram. Since this allows the reflection surface 6b to be flattened, the processing of the transparent condensing medium 6 can become easier.

Figure 19:
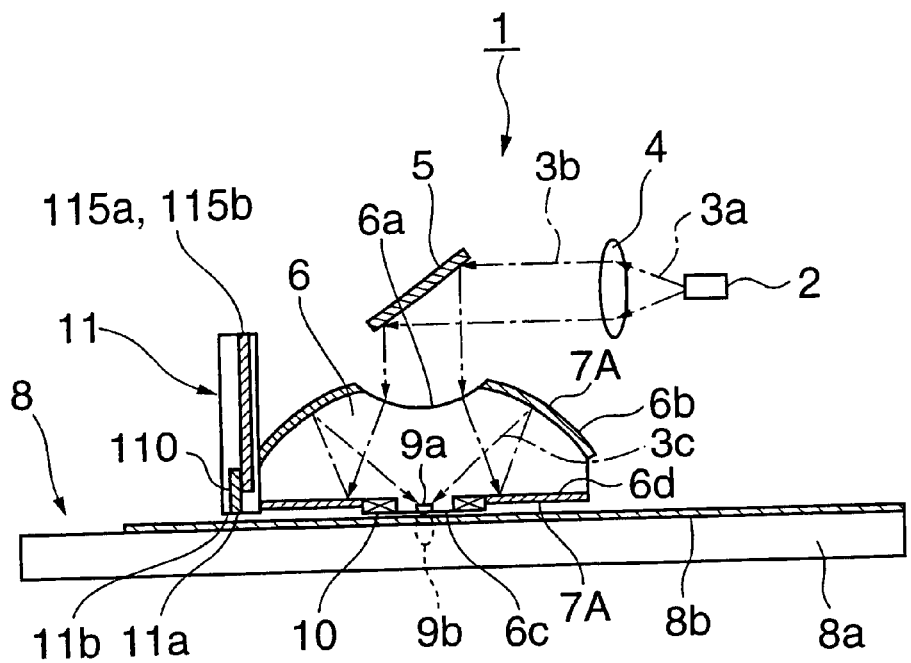
FIG. 19 is a side view of the recording/reproducing head of a seventh embodiment of the present invention.

FIG. 19 shows a recording/reproducing head according to a seventh embodiment of the present invention. The seventh embodiment substitutes the transparent condensing medium 6 of catadioptic type for the transparent condensing medium 6 in the shape of a paraboloid of revolution in the fifth embodiment.

The transparent condensing medium 6 has: the incident surface 6a in the shape of a concave sphere to which the parallel laser beam 3b is incident; the condense surface 6c provided in a position opposite to the incident surface 6a; a plane reflection surface 6d provided in the circumference of the condense surface; and an aspherical reflection surface 6b formed in the circumference of the incident surface 6a. The reflection film 7A is formed on each of the surfaces of the aspherical reflection surface 6b and the plane reflection surface 6d of the transparent condensing medium 6.

In the seventh embodiment, when the parallel laser beams 3b are incident to the incident surface 6a of the transparent condensing medium 6, the laser beams incident to the incident surface 6a diffuse on the incident surface 6a, the diffused-light reflects on the reflection film 7A formed on the plane reflection surface 6d, the reflected beam reflects again on the reflection film 7A formed on the aspherical reflection surface 6b and is condensed on the condense surface 6c, and the beam spot 9a is formed on the condense surface 6c. Recording and reproducing can be performed on the recording film 8b of the recording/reproducing disk 8 by the near field wave 9b leaking from the condense surface 6c. According to the seventh embodiment, since the same effect as the first embodiment is obtained and no condense lens is required, a small-sized head can be fabricated.

Figure 20:
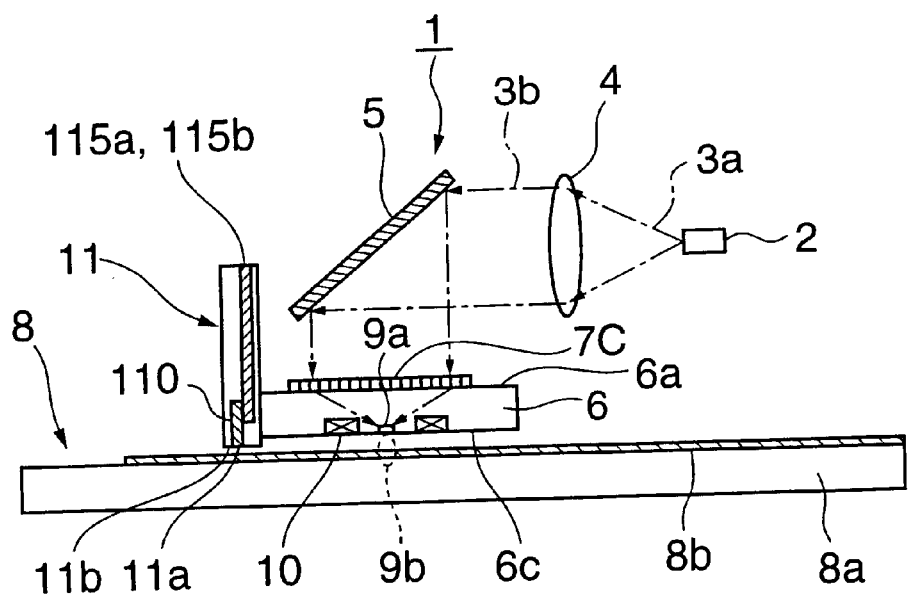
FIG. 20 is a side view of the recording/reproducing head of an eighth embodiment of the present invention.

FIG. 20 shows a recording/reproducing head according to an eighth embodiment of the present invention. The eighth embodiment substitutes the flat-plate transparent condensing medium 6 for the transparent condensing medium 6 in the shape of a paraboloid of revolution in the fifth embodiment, wherein a permeable hologram 7C is disposed on the incident surface 6a on the upper surface of the transparent condensing medium 6 and condenses the collimated beams 3b to form the beam spot 9a on the condense surface 6c. According to the seventh embodiment, since the same effect as the first embodiment is obtained and no condense lens is required, a small-sized head can be fabricated.

A rectangular or slit-shape opening may be provided on the condense surface 6c of the transparent condensing medium 6 shown in FIGS. 18, 19, and 20. Thereby, recording and reproducing can be performed at a higher density and a higher transfer rate.

Figure 21:
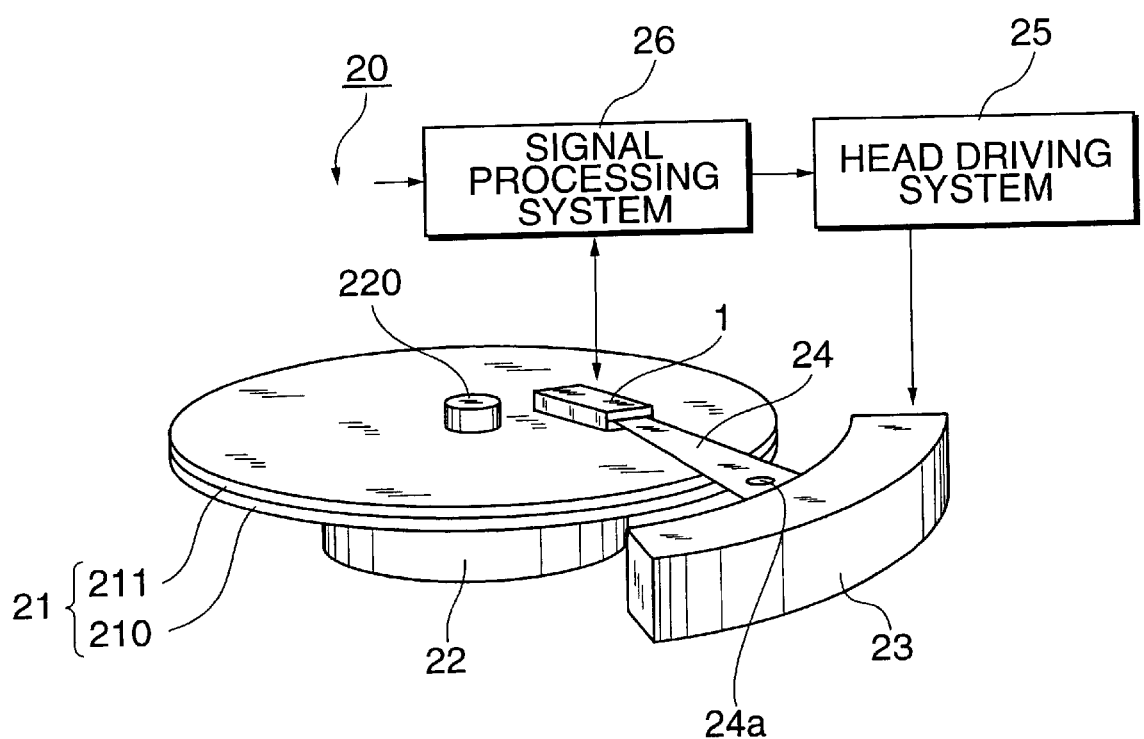
FIG. 21 is a perspective view of the recording/reproducing disk drive of a ninth embodiment of the present invention.

FIG. 21 shows a recording/reproducing disk drive 20 according to a ninth embodiment of the present invention. The recording/reproducing disk drive 20 has: a recording/reproducing disk 21 in which a recording layer 211 is formed on one side of a circular aluminum substrate 210 and which rotates about the rotation shaft 220 of a motor 22; a recording/reproducing head 1 that performs optical recording and magnetic reproducing on the recording layer 211 of the recording/reproducing disk 21; a linear motor 23 that allows the recording/reproducing head 1 to make access over the inner and outer circumferences of the recording/reproducing disk 21 and perform tracking; a swing arm 24 that supports the recording/reproducing head 1 at the linear motor 23 and is angularly moved about a fulcrum 24a; a head driving system 25 that drives the recording/reproducing head 1; and a signal processing system 26 that sends a laser driving signal to the recording/reproducing head 1 and processes signals from the recording/reproducing head 1.

Figure 22A:
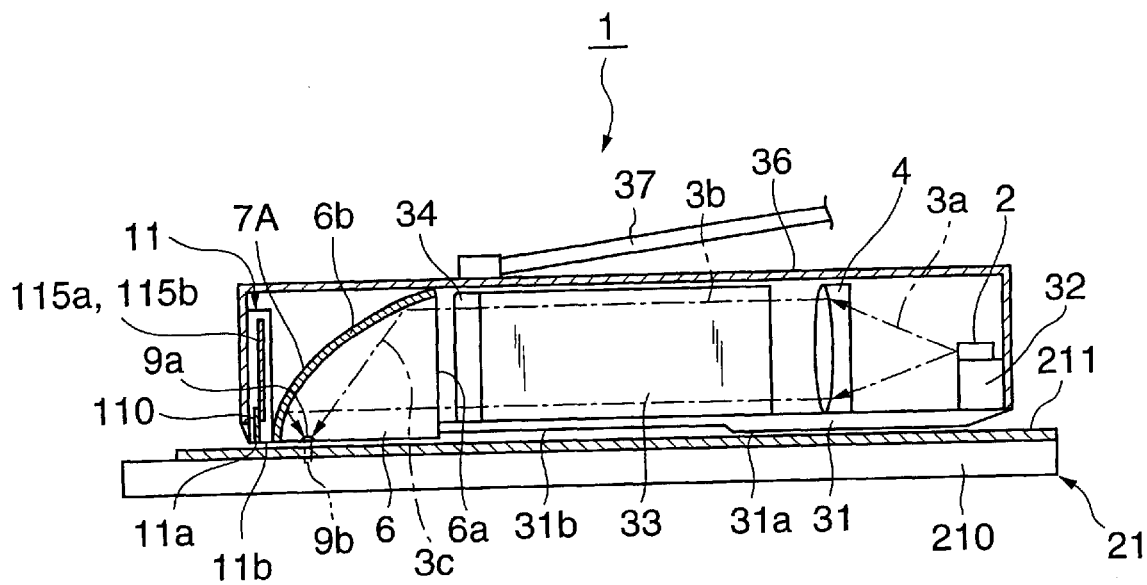
FIG. 22A is a side view of the recording/reproducing head of the ninth embodiment of the present invention.
Figure 22B:
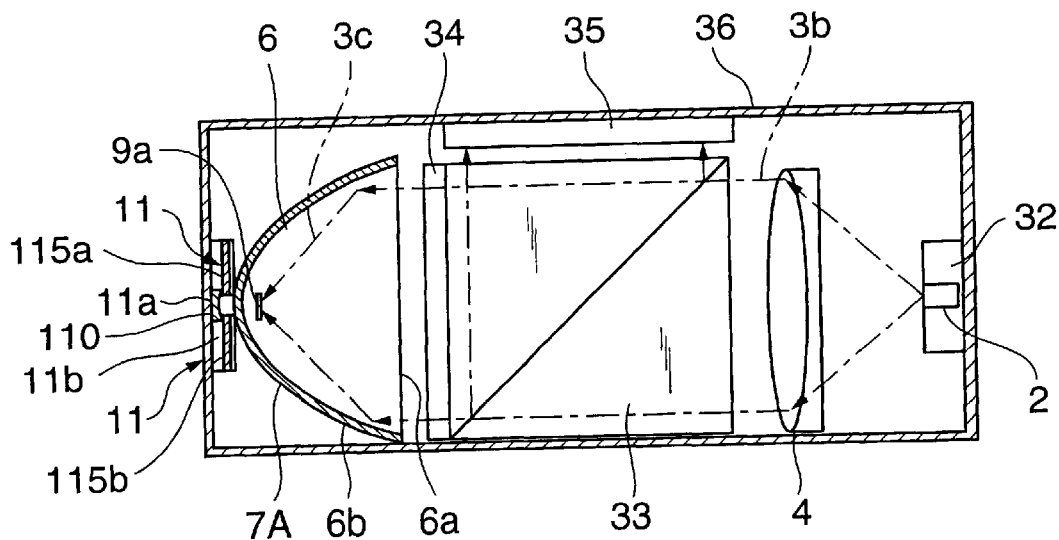
FIG. 22B is a bottom view.

FIG. 22 shows the recording/reproducing head 1 of the ninth embodiment; FIG. 9A, a side view thereof; and FIG. 9B, a plane view thereof. The recording/reproducing head 1 has: a flying slider 31 that flies on the recording/reproducing disk 21; on top of the flying slider 31, an edge emitting semiconductor laser 2 that emits the laser beam 3a; the collimator lens 4 that shapes the laser beam 3a to the collimated beam 3b; a quartz plate 32 that secures the edge emitting semiconductor laser 2; a polarized light beam splitter 33 that separates the collimated beams 3b from the semiconductor laser 2 and reflected beam from the recording/reproducing disk 21; a quarter wavelength plate 34 that converts the collimated beams 3b from the semiconductor laser 2 to circular polarized beam; the transparent condensing medium 6 that condenses the collimated beams 3b; the reflection film 7A formed by evaporating a metal such as Al on the reflection surface 6b of the transparent condensing medium 6; a light detector 35 input the reflected beam from the recording/reproducing disk 21 via the beam splitter 33; the circular detection part 11a that is almost identical in shape to the crescent recorded mark of the recording/reproducing disk 21; and the magnetic sensor 11 that reproduces magnetic signals from the recorded mark of the recording/reproducing disk 21. The whole of the recording/reproducing head 1 is housed in a head case 36 and the head case 36 is secured to the swing arm 24 of FIG. 21 through a suspension 37.

The transparent condensing medium 6 is made of, e.g., heavy flint glass having refractive index n of 1.91, and measures 0.6 mm high, 0.9 mm long, and 1.8 mm wide. This transparent condensing medium 6, like the transparent condensing medium 6 shown in FIG. 16, has the incident surface 6a, the reflection surface 6b in the shape of a paraboloid of revolution, and the condense surface 6c, which forms part of the flying slider 31. The flying slider 31 has a convex part 31a in which positive pressure occurs, and a concave part 31b in which negative pressure occurs, and a proper flying height of approximately 100 nm or less is kept by the balance of both. The flying slider 31 is made of a material having a refractive index equal to that of the transparent condensing medium 6, and the convex part 31a at the lower side of the flying slider 31 may also sever as the condense surface 6c of the transparent condensing medium 6.

FIG. 23 gives details of the recording/reproducing disk 21. The recording/reproducing disk 21 uses the aluminum substrate 210, on one or both (FIG. 23 shows an example of a single side) of the surfaces of which grooves 21a for tracking are formed. On top of the grooves 21a are successively formed a protection layer 221a made of SiNx, a recording layer 221b made of a so-called magneto-optic recording film such as TbFeCo, a TbDyFeCo layer 221c having a large leak magnetic field, and a surface protection layer 221d. A lubricant may be applied further on top of them.

In this embodiment, the land part 21b is recording tracks on which information is recorded. The size of the beam spot 9a is approximately 0.2 μm, the track width is approximately 0.2 μm, the track pitch is approximately 0.25 μm, the depth of the groove 21 is approximately 0.05 μm. The LP-MFM recording method is used, and information can be reproduced for mark lengths of 0.05 μm or longer. This achieves a density three or more times higher than that with the conventional OAM recording method. The recording density is approximately 40 Gbits/(inch)$^2$, which is equivalent to a storage capacity of approximately 40 GB for 3.5-inch disks, achieving a density eight or more times higher than that of conventional hard disks.

Although, in this embodiment, a so-called magneto-optic recording film is used for the recording layer, without the present invention being limited to this, Co—Cr—Ta or the like used as a recording film of a hard disk may also be used; since recording can be performed with residual magnetization reduced by optical heating, films having strong residual magnetization at a room temperature can also be used for recording. Materials available for the substrate of the recording/reproducing disk 21 include Si and polycarbonate or the like superficially ground, in addition to aluminum.

FIGS. 24A and 24B show the semiconductor laser 2 according to this embodiment. The semiconductor laser 2, which is a beam scannable type, has: a substrate 200; an upper electrode 201 disposed on the upper side of the substrate 200; a lower electrode 202 disposed on the lower side of the substrate 200; and an active layer 203 in the middle. The main part 204a and the tip part 204b of a ridge which narrows the oscillation region of the active layer 203 are 3 μm and 5 μm in width, respectively, and 300 μm and 50 μm in length, respectively. The upper electrode 201 has a main electrode 201a, and a pair of tip electrodes 201b disposed at the right and left the tip part 204a. Output laser beams are scanned right and left by alternately applying current to the tip electrode. The scanning width is approximately 1 μm and scanning frequency is up to 30 MHz. The scanning of laser beam is used in the high-frequency region in tracking.

AlGaInP was used as a material of the active layer 203 and oscillation wavelength is 630 nm. The refractive index and NA of the transparent condensing medium 6 are 1.91 and 0.85, respectively, and the spot size of the beam spot 9a on the condense surface 6c is approximately 0.2 μm as seen from the expression (1). Near field wave leaking from the beam spot 9a is irradiated to the recording layer 211 of the recording/reproducing disk 21 and current based on recording information was applied to the coil 10, and thereby laser-pumped MFM (modified field magnetic) recording is performed, so that the record of minimum mark length 0.06 μm in the track direction is achieved.

The signal processing system 26 generates an error signal for tracking and a data signal based on the reflected beam from the recording/reproducing disk 21 detected by the optical detector 35, the error signal is divided into a high frequency error signal and a low frequency error signal through a high pass filter and a low pass filter. The head driving system 25 is controlled the tracking with regards to these error signals by the signal processing system. The error signal for tracking is generated by means of the sample servo system (Optical Disk Technology, Radio Gijutsu Co., P. 95), and in the sample servo system, the wobbled mark is provided intermittently on the track, an error signal is generated based on the intensity change of the reflected beam from the track. Tracking control is performed by means of two-step control in which the linear motor 23 for driving the swing arm 24 is controlled based on the low frequency error signal and the beam scanning semiconductor laser 2 is controlled based on the high frequency error signal, and thus the precise tracking that covers from low frequency to high frequency is implemented. Because the recording signal and the tracking error signal are separated time-divisionally in the case of Sample Servo System, the recording signal and tracking error signal are separated by a gate circuit in a reproduction circuit. As described hereinabove, because the recording signal and the error signal are separated time-divisionally by applying the sample servo system, a separation type optical detector is not needed. Furthermore, in the case of the optical sample servo, the servo mark can be formed by pressing. So the servo marks are positioned accurately and can be made efficiently, in comparison with magnetic marking in which the mark is written on each.

The error signal may be generated by push-pull system, which utilize the interference with the reflected beam from the groove 21a. In this case, because the error signal is formed based on the intensity difference between the right and left reflected beams, a two-section type optical detector must be used for the detection.

During reproduction, the resistivity change of the magnetic sensor 11 based on the direction of the leakage magnetic flux from the recording mark is read out as a voltage change by use of the GMR magnetic sensor 11, then a reproduction signal is obtained. The error signal by means of the abovementioned optical detector 35 is used also for tracking control during reproduction. In this case, the laser scanning cannot be used, but because the detection width of the magnetic sensor 11 is about 20% larger than the track width, the necessary servo band width necessary for tracking is reduced by one order of magnitude, and tracking can be performed only by driving the swing arm. Alternatively, high frequency tracking may be performed by attaching a piezo-electric element to the GMR sensor.

Because the error signal is generated by use of the optical detector 35, the beam spot 9a and the magnetic sensor 11 can track simultaneously, verification (verification of the recording) can be performed immediately after recording by reproducing the recorded signal. Contrary to a conventional disk, additional rotation is not required for verification, which reduces the recording time to a half.

Next, the operation of the optical disk apparatus 20 is explained. The recording/reproducing disk 21 is rotated at a predetermined rotation speed by the motor 22. The flying slider 31 is filed above the recording/reproducing disk 21 by the positive and negative pressure generated as the result of rotation of the recording/reproducing disk 21 and spring force of the suspension 37, and traced on the predetermined track by the head driving system 25. The laser beam 3a activated by the signal processing system 26 is emitted from the semiconductor laser 2, and is converted to a collimated beam 3b by the collimator lens 4. It passes through the polarized beam splitter 33 and the quarter wavelength plate 34, and is incident on the incident surface 6a of the transparent condensing medium 6. The collimated laser beam 3b is converted to a circularly polarized beam when the beam passes through the quarter wavelength plate 34. The circularly polarized collimated beam that has been incident on the incident surface 6a of the transparent condensing medium 6 is reflected on the reflecting surface 6b and reflecting film 7A coated on the outside surface of the reflecting surface 6b, and is condensed on the condense surface 6c to form the beam spot 9a. The near field wave 9b leaks to the outside of the condense surface 6c from the beam spot 9a, the near field wave 9b is propagated to the recording layer 211 of the recording/reproducing disk 21, and optical recording is carried out. The reflected beam on the recording/reproducing disk 21 returns the way of the incident beam reversely, reflected on the reflecting film 7A, reflected at an angle of 90 degrees by the polarized beam splitter 33, and is incident on the optical detector 35. The signal processing system 26 generates a tracking error signal based on the reflected beam from the recording/reproducing disk 21 that has been incident on the optical detector 35 when recording to activate the head driving system 25, controls the laser beam 3a and the swing arm 24 to scan for tracking, and further verifies the recording by use of the reproduced signal from the magnetic sensor 11.

During reproduction, the signal processing system 26 drives the semiconductor laser 2 so as to emit the near field wave 9b having the low intensity so that it is not recorded on the recording layer 211 of the recording/reproducing disk 21, generates the error signal based on the reflected beam from the disk 21, and reproduces the recorded information in the recording layer 211 by means of the magnetic sensor 11.

According to the recording/reproducing disk drive 20 constructed as described above, since the curvature of the detection part 11a of the magnetic sensor 11 is made almost equal to that of the crescent recording mark 81 like the first embodiment, resolution is increased and information can be correctly reproduced. As a result, a recording density can be substantially increased even when the LP-MFM recording method is used, so that a high transfer rate can be achieved.

Since a small-sized recording/reproducing head can be obtained, the tracking can be performed more rapidly.

Although the recording/reproducing head of the fifth embodiment is used as the recording/reproducing head 1 of this embodiment, a recording/reproducing head according to other embodiments may be used. When the rectangular opening 13 of the third embodiment is used, the laser beams 3a cannot be scanned for tracking; the recording/reproducing head itself or the transparent condensing medium must be driven by a piezoelectric element or the like.

Figure 25:
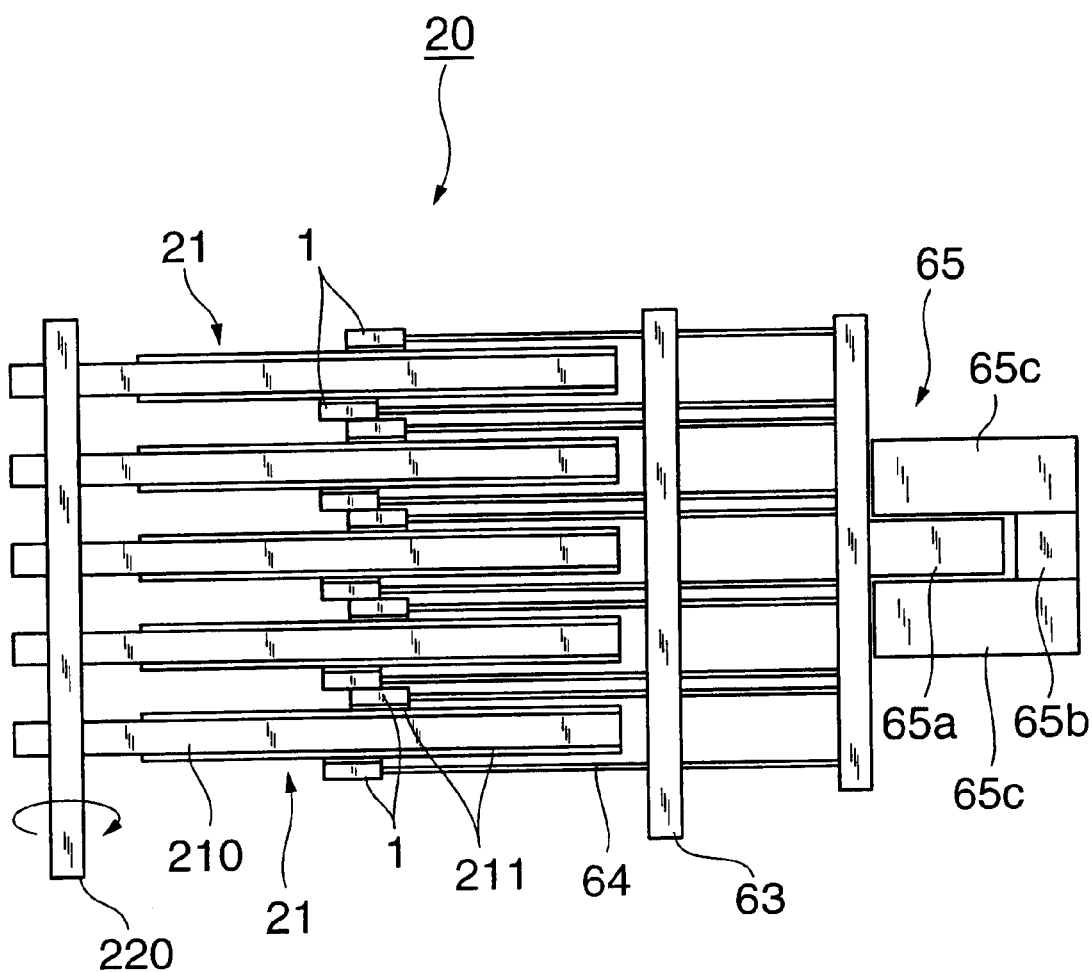
FIG. 25 is a perspective view of the recording/ reproducing disk drive of a tenth embodiment of the present invention.

FIG. 25 shows the recording/reproducing disk drive 20 according to a tenth embodiment of the present invention. The recording/reproducing disk drive 20 applies recording/reproducing heads 1 to a recording/reproducing disk drive with five disks stacked, the recording/reproducing heads 1 using the transparent condensing medium 6 of the fifth embodiment, and has: five recording/reproducing disks 21 in each of which magneto-optic recording layers 211 are formed on the upper and lower side each of aluminum substrates 210; 10 recording/reproducing heads 1 each of which flies and scan the recording medium of each of the recording/reproducing disks 21; suspensions 64 that rotatably support the recording/reproducing heads 1 by a rotation shaft 63; and a rotational linear motor 65 that drives the suspensions 64. The rotational linear motor 65 has: a movable member 65a to which the suspensions 64 are directly coupled; and electromagnets 65c, coupled by a yoke 65b, that drive the movable member 65a.

The recording/reproducing heads 1 and the suspensions 64 are structured in the same way as those of the ninth embodiment, with the beam spot 9a of each recording/reproducing head 1 and the magnetic sensor 11 being set to be capable of tracking identical tracks at a time. The size of the beam spot 9a is also the same as that of the ninth embodiment; in a case of using a disk diameter of 3.5 inches, the recording capacity is increased to 400 GB. Since recording or reproducing can be performed on plural tracks at a time, a high transfer rate can be achieved during recording or reproducing.

Figure 26:
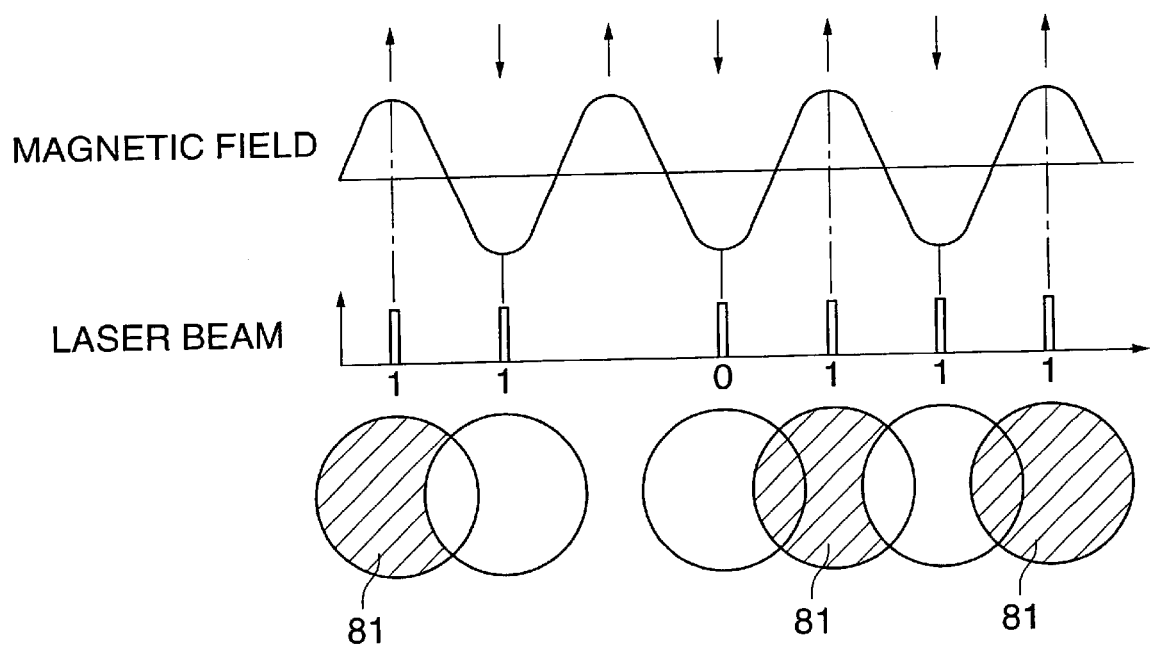
FIG. 26 shows a recording method of another embodiment of the present invention.
Figure 27:
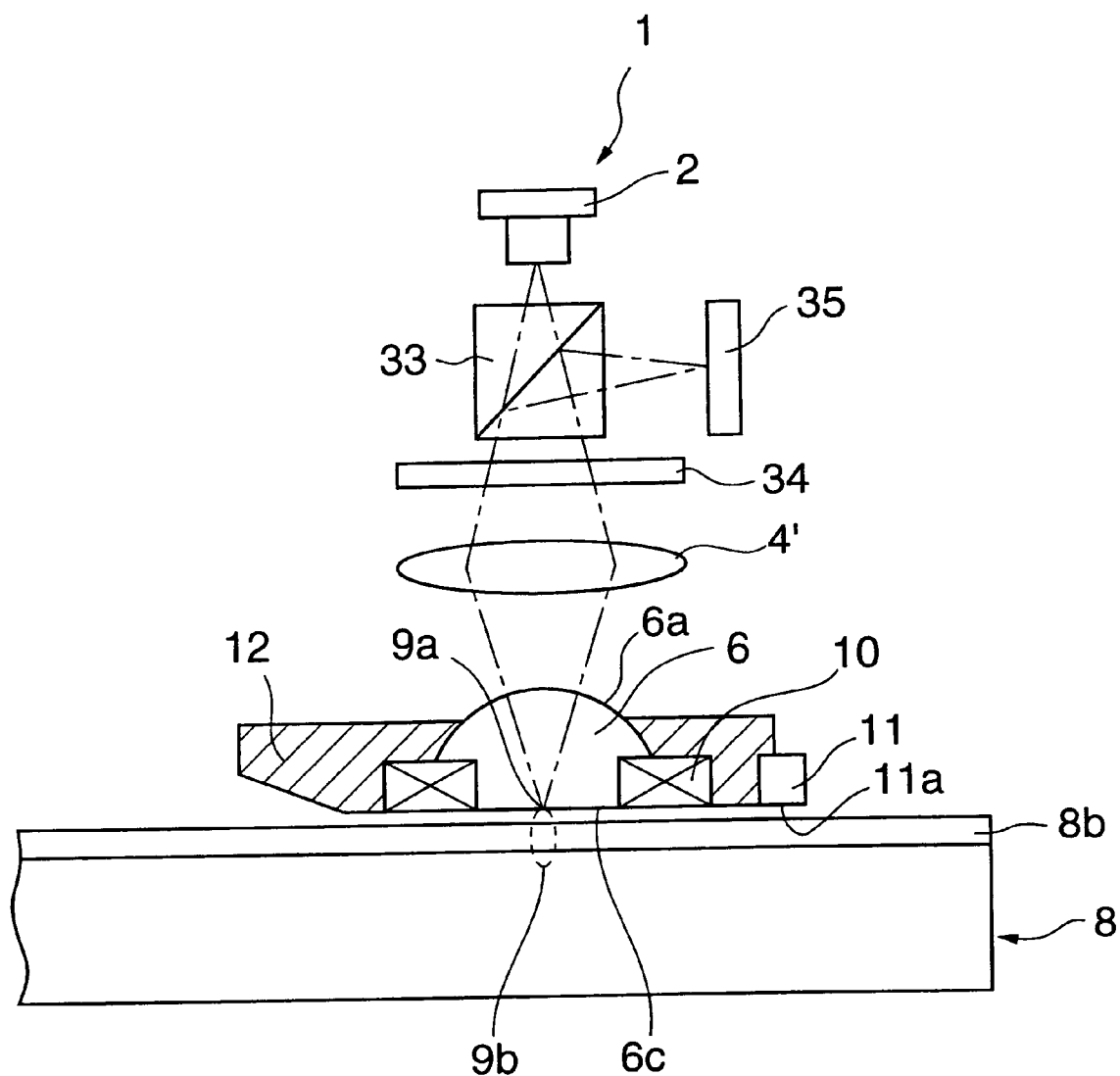
FIG. 27 shows a conventional recording/reproducing disk drive.
Figure 28:
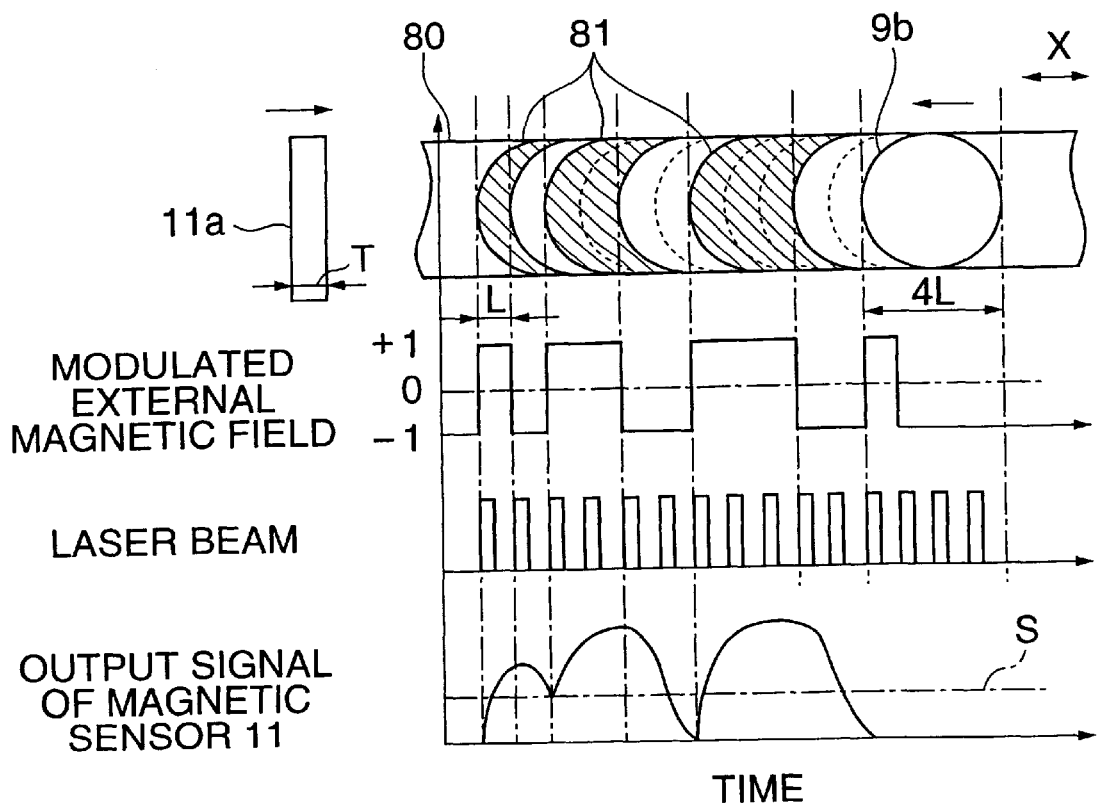
FIG. 28 shows recording and reproducing operations of a conventional recording/reproducing disk drive.
Figure 29:
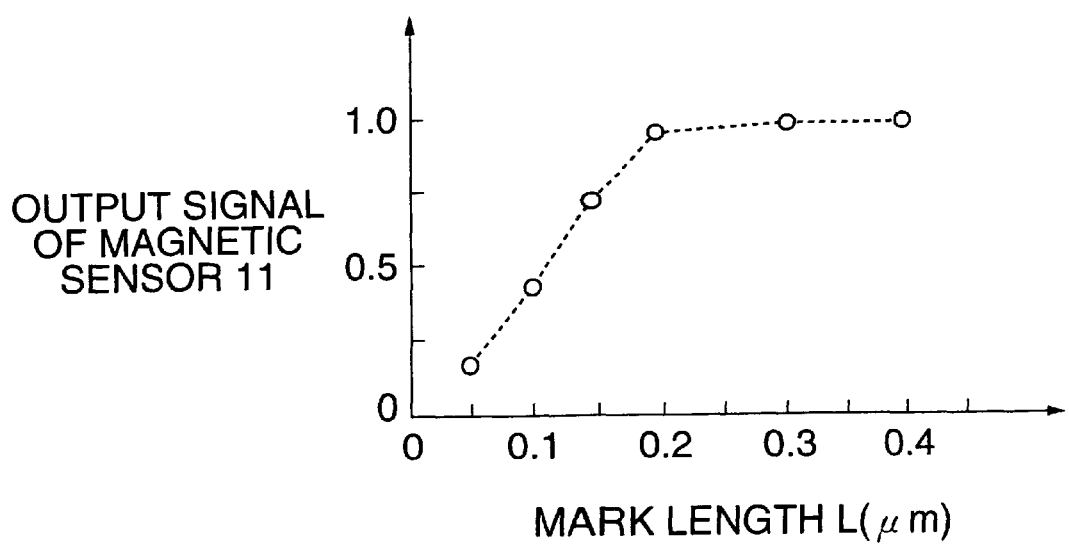
FIG. 29 shows the properties of output signals of a conventional magnetic sensor.

FIG. 26 shows a recording method of another embodiment of the present invention. The above-described embodiments use the so-called LP-MFM recording method that performs recording by modulating external magnetic fields corresponding to recording information and irradiating pulse-shaped laser beams at an equal time interval. This embodiment is different from the above-described embodiments in, as shown in FIG. 26, its recording method of applying external magnetic fields cyclically (sine wave shape) by a resonance coil and irradiating pulse-shaped laser beams at the peaks of the external magnetic fields in the plus direction (upward) and the minus direction (downward) according to the recording information. The recorded mark 81 of this method are formed in a crescent shape when the recording density is increased. So the same effect can be expected in this embodiment, either.

As has been described above, according to the present invention, since the detection part of the magnetic sensor is constructed to be almost equal in shape to a recorded mark, when a signal is being reproduced from one recording mark, signals of the other recorded marks are not picked up, so that resolution is increased. Since output signals of the magnetic sensor are symmetrical between preceding and following portion of a mark and the distortion is reduced, the amount of jitter during conversion into a digital signal is improved. So the information can be correctly reproduced. As a result, a recording density can be substantially increased even when the LP-MFM recording method is used, and a high transfer rate can be achieved without increasing the rotation speed of the recording/reproducing disk.

What is claimed is:

1. A recording/reproducing head, which records a recorded mark on a recording/reproducing disk by applying a magnetic field and irradiating a near field wave and detects a magnetic field from the recorded mark with a magnetic sensor, comprising:

a laser beam emitting unit that emits a laser beam;

an optical system, including a transparent condensing medium having an incident surface on which the laser beam is incident, and a condense surface on which the laser beam incident on the incident surface is condensed, the optical system guiding the laser beam from the laser beam emitting unit to the incident surface, forming a beam spot by condensing the laser beam on the condense surface, and irradiating the near field wave from the beam spot onto the recording/reproducing disk; and a magnetic field applying unit, provided near a position where the beam spot is formed, that applies the magnetic fields, wherein a detection part of the magnetic sensor is almost equal in shape to the recorded mark.

2. The recording/reproducing head according to claim 1, wherein the recorded mark is in the shape of a crescent having a predetermined curvature, and wherein the detection part of the magnetic sensor has a curvature almost equal to the predetermined curvature.

3. The recording/reproducing head according to claim 1, wherein the optical system has a shading element including an opening having a first predetermined shape for limiting an irradiation range of the near field wave to render the recorded mark into a second shape, and wherein the detection part of the magnetic sensor has a shape almost equal to the second shape.

4. The recording/reproducing head according to claim 3, wherein the shading element has the opening of a rectangular shape, wherein a pair of parallel sides of the rectangular opening are almost orthogonal to recording tracks of the recording/reproducing disk and the opening limits the irradiation range of the near field wave to render the recorded mark rectangle, and wherein the detection part of the magnetic sensor has a rectangular shape.

5. The recording/reproducing head according to claim 4, wherein the pair of sides of the opening are longer than the diameter of the beam spot.

6. The recording/reproducing head according to claim 1, wherein the magnetic sensor has the plural detection parts, and the magnetic field applying unit includes plural magnetic field modulation coils corresponding to the plural detection parts.

7. The recording/reproducing head according to claim 3, wherein the magnetic sensor has the plural detection parts, the shading element has the plural openings, and the magnetic field applying unit includes plural magnetic field modulation coils corresponding to the plural detection parts.

8. The recording/reproducing head according to claim 1, wherein the optical system includes a condensing unit which condenses the laser beam from the laser beam emitting unit and makes the laser beam incident on the incident surface of the transparent condensing medium.

9. The recording/reproducing head according to claim 8, wherein the condensing unit comprises a condense lens.

10. The recording/reproducing head according to claim 8, wherein the condensing unit comprises a reflection mirror which deflects a path of the laser beam from the laser beam emitting unit, and a condense lens which condenses the laser beam reflected by the reflection mirror.

11. The recording/reproducing head according to claim 1, wherein the transparent condensing medium comprises a hemispherical solid immersion lens.

12. The recording/reproducing head according to claim 1, wherein the transparent condensing medium comprises a truncated super-spherical solid immersion lens.

13. The recording/reproducing head according to claim 1, wherein the transparent condensing medium comprises a transmission-type hologram, disposed on the incident surface, that condenses the laser beam incident on the incident surface to form the beam spot on the condense surface.

14. The recording/reproducing head according to claim 1, wherein the transparent condensing medium includes a condensing surface which condenses the laser beam incident on the incident surface to form the beam spot on the condense surface.

15. The recording/reproducing head according to claim 14, wherein the condensing surface of the transparent condensing medium is part of an ellipsoid of revolution.

16. The recording/reproducing head according to claim 14, wherein the condensing surface of the transparent condensing medium is part of a paraboloid of revolution.

17. The recording/reproducing head according to claim 14, wherein the condensing surface of the transparent condensing medium includes a reflector reflecting the laser beam from the laser beam emitting unit on the surface of the condensing medium.

18. The recording/reproducing head according to claim 17, wherein the reflector comprises a reflection type hologram.

19. The recording/reproducing head according to claim 1, wherein the transparent condensing medium has a refractive index greater than 1.

20. The recording/reproducing head according to claim 1, wherein the transparent condensing medium comprises first and second transparent media, tightly coupled together, that have an almost identical refractive index, wherein the first transparent medium has the incident surface, and wherein the second transparent medium comprises a flying slider which flies above the recording/reproducing disk by the rotation of the recording/reproducing disk and the flying slider has the condense surface.

21. The recording/reproducing head according to claim 1, wherein the laser beam emitting unit periodically emits the pulse-shaped laser beam, and the magnetic field applying unit applies the magnetic, fields modulated with a recording signal synchronously with the emission of the pulse-shaped laser beam.

22. The recording/reproducing head according to claim 1, wherein the magnetic field applying unit applies the magnetic field direction of which is changed periodically, and wherein the laser beam emitting unit emits the laser beam at a timing corresponding to a recording signal for recording on the recording/reproducing disk.

23. A recording/reproducing disk drive having a recording/reproducing head that records a recorded mark on a recording/reproducing disk by applying a magnetic field and irradiating a near field wave and detects a magnetic field from the recorded mark by a magnetic sensor, wherein the recording/reproducing head comprises:

a laser beam emitting unit that emits a laser beam;

an optical system, including a transparent condensing medium having an incident surface on which the laser beam is incident, and a condense surface on which the laser beam incident on the incident surface is condensed, the optical system guiding the laser beam from the laser beam emitting unit to the incident surface, forming a beam spot by condensing the laser beam on the condense surface, and irradiating the near field wave from the beam spot onto the recording/reproducing disk; and a magnetic field applying unit, provided near a position where the beam spot is formed, that applies the magnetic field, wherein a detection part of the magnetic sensor is almost equal in shape to the recorded mark.

24. A recording/reproducing disk drive having plural recording/reproducing disks coaxially disposed at a predetermined interval and plural recording/reproducing heads each of which records a recorded mark on the recording/reproducing disk by applying a magnetic field and irradiating a near field wave and detects a magnetic field from the recorded mark by a magnetic sensor, wherein each of the recording/reproducing heads comprises:

a laser beam emitting unit that emits a laser beam;

an optical system, including a transparent condensing medium having an incident surface on which the laser beam is incident, and a condense surface on which the laser beam incident on the incident surface is condensed, the optical system guiding the laser beam from the laser beam emitting unit to the incident surface, forming a beam spot by condensing the laser beam on the condense surface, and irradiating the near field wave from the beam spot onto the recording/reproducing disk; and a magnetic field applying unit, provided near a position where the beam spot is formed, that applies the magnetic field, wherein a detection part of the magnetic sensor is almost equal in shape to the recorded mark.

* * * * *